(12) United States Patent (10) Patent No.: US 8,689,295 B2
Hidalgo et al. (45) Date of Patent: Apr. 1, 2014

(54) FIREWALLS FOR PROVIDING SECURITY IN HTTP NETWORKS AND APPLICATIONS

(75) Inventors: Llius Mora Hidalgo, Martorell (ES); Xabier Panadero Lleonart, Terrasa (ES)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/418,725

(22) Filed: Mar. 13, 2012

(65) Prior Publication Data

US 2012/0260315 A1 Oct. 11, 2012

Related U.S. Application Data

(63) Continuation of application No. 09/859,123, filed on May 16, 2001, now abandoned.

(51) Int. Cl.
*G06F 7/04* (2006.01)
*G06F 15/16* (2006.01)
*G06F 17/30* (2006.01)
*H04L 29/06* (2006.01)

(52) U.S. Cl.
USPC .......................................................... 726/4

(58) Field of Classification Search
None
See application file for complete search history.

(56) References Cited

U.S. PATENT DOCUMENTS

| 5,680,461 | A | 10/1997 | McManis |
| 5,692,124 | A | 11/1997 | Holden et al. |
| 5,960,177 | A | 9/1999 | Tanno |
| 5,978,787 | A | 11/1999 | Wong et al. |
| 6,101,543 | A | 8/2000 | Alden et al. |
| 6,131,162 | A | 10/2000 | Yoshiura et al. |
| 6,212,636 | B1 | 4/2001 | Boyle et al. |
| 6,253,374 | B1 * | 6/2001 | Dresevic et al. ............... 717/126 |
| 6,311,278 | B1 | 10/2001 | Raanan et al. |
| 6,363,479 | B1 * | 3/2002 | Godfrey et al. ............... 713/160 |
| 6,643,650 | B1 | 11/2003 | Slaughter et al. |
| 6,735,694 | B1 | 5/2004 | Berstis et al. |
| 6,760,844 | B1 | 7/2004 | McCarthy et al. |

(Continued)

FOREIGN PATENT DOCUMENTS

EP 0909072 A2 4/1999
WO 0107979 A2 2/2001

OTHER PUBLICATIONS

HIVE: Technical Overview and Technology behind HIVE (www.www.s21sec.com/en/html/menu.html?to=hiveto), Oct. 12, 2001.
AppShield White Paper, Sanctum, Inc. Mar. 2001, pp. 1-24.

(Continued)

*Primary Examiner* — Nadia Khoshnoodi
(74) *Attorney, Agent, or Firm* — Schmeiser, Olsen & Watts, LLP; Arthur Samodovitz

(57) ABSTRACT

Systems and methods provide security to HTTP applications. Responses sent from a server, such as a web server, are analyzed and a signature is generated for each HTML object in that page. The signature is encrypted and sent to a client along with the contents of the page. When a client later sends a request, the system checks the signature associated with that request with the contents of the request itself. If the values, variables, lengths, and cardinality of the request are validated, then the request is forwarded to the web server. If, on the other hand, the request is invalidated, the request is blocked from reaching the web server, thereby protecting the web server from malicious attacks. The systems and methods offer security without being limited to a session or user.

14 Claims, 24 Drawing Sheets

(56) References Cited

U.S. PATENT DOCUMENTS

| | | |
|---|---|---|
| 2002/0007453 A1 | 1/2002 | Nemovicher |
| 2002/0091928 A1 | 7/2002 | Bouchard et al. |
| 2002/0095507 A1 | 7/2002 | Jerdonek |
| 2002/0143885 A1 | 10/2002 | Ross, Jr. |
| 2002/0152378 A1 | 10/2002 | Wallace et al. |
| 2003/0046533 A1 | 3/2003 | Olkin et al. |
| 2003/0051142 A1 | 3/2003 | Hidalgo et al. |
| 2003/0191970 A1 | 10/2003 | Devine et al. |

OTHER PUBLICATIONS

Daemen, Joan; AES Proposal, The Rijndael Block Cipher, Annex to AES, Oct. 1998, pp. 1-25, along with document version 2, Mar. 9, 1999, pp. 1-45.

Workshop on Algoirthmic Aspects of Advanced Programming Languaages WAAAPL '99, Sep. 30, 1999, pp. 1-116.

* cited by examiner

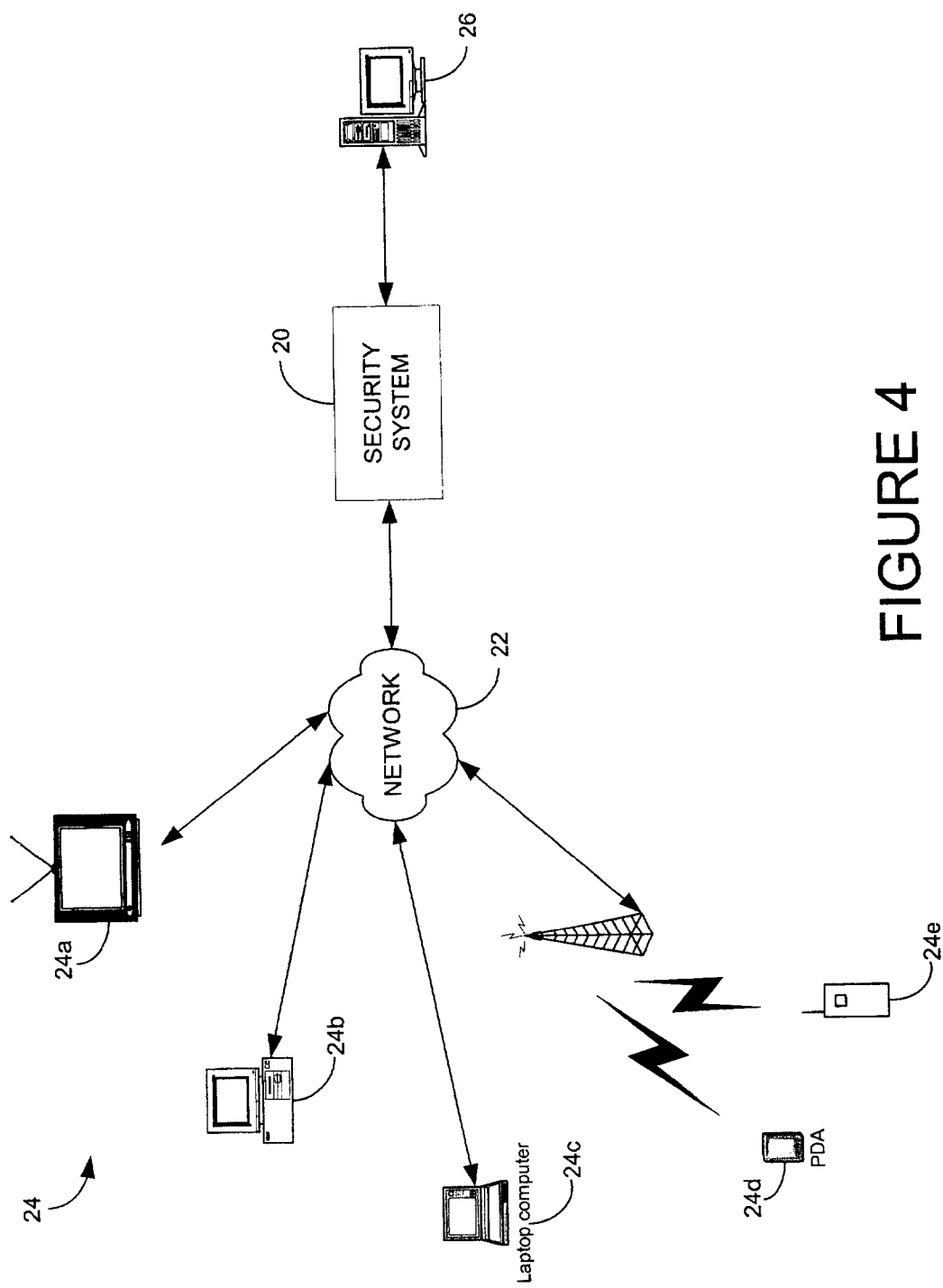

HIVE CONFIG

| s21sec Config | | | | | | | | | |
|---|---|---|---|---|---|---|---|---|---|
| General | CustomError | Key | Nodes | Domains | StartPages | ExceptPages | Default | AdminMail | User |

Config Name
s21sec
Config Settings [Edit]
EZ HIVE No

[Save Config] [Cancel]

HIVE CONFIG

| s21sec Config | | | | | | | | |
|---|---|---|---|---|---|---|---|---|
| General | CustomError | Key | Nodes | Domains | StartPages | ExceptPages | Default | AdminMail | User |

Config Name  [Save]
[s21sec]     [Reset]
Config Settings
☐ EZ HIVE   [Cancel]

[Save Config] [Cancel]

FIGURE 16

HIVE CONFIG

| s21sec Config | | | | | | | | |
|---|---|---|---|---|---|---|---|---|
| General | CustomError | Key | Nodes | Domains | StartPages | ExceptPages | Default | AdminMail | User |

Custom Error
URL Error

Redirection to: [_____]  [Add] [Reset]

Signature Not Found (Error)

Redirection to: [_____]  [Add] [Reset]

Signature Not Mismatch (Error)

Redirection to: [_____]  [Add] [Reset]

Tamper Error

Redirection to: [_____]  [Add] [Reset]

[Save Config] [Cancel]

FIGURE 17

HIVE CONFIG

| s21sec Config | | | | | | | | |
|---|---|---|---|---|---|---|---|---|
| General | CustomError | Key | Nodes | Domains | StartPages | ExceptPages | Default | AdminMail | User |

Generate New Key

New [Key] width Size [128 ▾] and Life Time [1 hour ▾]

Actual Key

Key of 128 bits with one hour of Life Time

Key: Ca9C76fe3cFEC7A5

Old Key

Key of 128 bits with one hour of Life Time

Key: C9dEecA47fD7eC6a   [Save Config] [Cancel]

FIGURE 18

HIVE CONFIG

| s21sec Config | | | | | | | | |
|---|---|---|---|---|---|---|---|---|
| General | CustomError | Key | Nodes | Domains | StartPages | ExceptPages | Default | AdminMail | User |

Generate New Key

New [Key] width Size [128 ▾] and Life Time [1 hour ▾]
128
Actual Key       192
                 256
Key of 128 bits with one hour of Life Time

FIGURE 19

HIVE CONFIG

| s21sec Config | | | | | | | | |
|---|---|---|---|---|---|---|---|---|
| General | CustomError | Key | Nodes | Domains | StartPages | ExceptPages | Default | AdminMail | User |

Generate New Key

New [Key] width Size [128 ▾] and Life Time [1 hour ▾]

Actual Key                                  1 hour
                                            1 day
Key of 128 bits with one hour of Life Time  1 week
                                            1 month
Key: Ca9C76fe3cFEC7A5                       Forever

FIGURE 20

HIVE CONFIG

| s21sec Config | | | | | | | | | |
|---|---|---|---|---|---|---|---|---|---|
| General | CustomError | Key | Nodes | Domains | StartPages | ExceptPages | Default | AdminMail | User |

New Node
☐ ☐ ☐ ☐ [Add] [Clear]

Available Nodes 1 2 3 4 [Edit] [Delete]

[Save Config] [Cancel]

FIGURE 21

HIVE CONFIG

| s21sec Config | | | | | | | | | |
|---|---|---|---|---|---|---|---|---|---|
| General | CustomError | Key | Nodes | Domains | StartPages | ExceptPages | Default | AdminMail | User |

Editing Node

[1] [2] [3] [4] [Save] [Reset] [Cancel]

[Save Config] [Cancel]

FIGURE 22

HIVE CONFIG

| s21sec Config | | | | | | | | | |
|---|---|---|---|---|---|---|---|---|---|
| General | CustomError | Key | Nodes | Domains | StartPages | ExceptPages | Default | AdminMail | User |

New Domain
  Protocol    Host            Port
  [http//  ▼] [            ] :[   ]    [Add] [Clear]

Map to
  Protocol      IP            Port
  [http//  ▼] [  ].[  ].[  ].[  ] :[   ]

Available Domains
http//www.s21sec.com
              [Edit] [Delete]
Mapped to: http//------------

[Save Config] [Cancel]

FIGURE 23

HIVE CONFIG

| s21sec Config | | | | | | | | | |
|---|---|---|---|---|---|---|---|---|---|
| General | CustomError | Key | Nodes | Domains | StartPages | ExceptPages | Default | AdminMail | User |

New Domain
  Protocol      Host            Port
  [http//  ▼] [ww.s21sec.com] :[   ]    [Save] [Reset] [Cancel]

Map to
  Protocol      IP            Port
  [http//  ▼] [  ].[  ].[  ].[  ] :[   ]

[Save Config] [Cancel]

FIGURE 24

HIVE CONFIG

| s21sec Config | | | | | | | | | |
|---|---|---|---|---|---|---|---|---|---|
| General | CustomError | Key | Nodes | Domains | StartPages | ExceptPages | Default | AdminMenu | User |

New Start Page

[http//www.s21sec.com ▼] / [_____] [Add] [Clear]

Available Start Pages http//www.s21sec.com/ [Edit] [Delete]

http//www.s21sec.com/img/* [Edit] [Delete]

[Save Config] [Cancel]

FIGURE 25

HIVE CONFIG

| s21sec Config | | | | | | | | | |
|---|---|---|---|---|---|---|---|---|---|
| General | CustomError | Key | Nodes | Domains | StartPages | ExceptPages | Default | AdminMenu | User |

New Start Page

[http//www.s21sec.com ▼] / [_____] [Save] [Reset] [Cancel]

[Save Config] [Cancel]

FIGURE 26

HIVE CONFIG

| s21sec Config | | | | | | | | | |
|---|---|---|---|---|---|---|---|---|---|
| General | CustomError | Key | Nodes | Domains | StartPages | ExceptPages | Default | AdminMail | User |

New Except Page http//www.s21sec.com ▼ / [____] [Add] [Clear]

Available Except Pages http//www.s21sec.com/except.html [Edit] [Delete]

[Save Config] [Cancel]

FIGURE 27

HIVE CONFIG

| s21sec Config | | | | | | | | | |
|---|---|---|---|---|---|---|---|---|---|
| General | CustomError | Key | Nodes | Domains | StartPages | ExceptPages | Default | AdminMail | User |

Editing Except Page http//www.s21sec.com ▼ / except.html [Save] [Reset] [Cancel]

[Save Config] [Cancel]

FIGURE 28

HIVE CONFIG

| s21sec Config | | | | | | | | | |
|---|---|---|---|---|---|---|---|---|---|
| General | CustomError | Key | Nodes | Domains | StartPages | ExceptPages | Default | AdminMail | User |

New Default

[____] [Add] [Clear]

Available Defaults

[Save Config] [Cancel]

FIGURE 29

HIVE CONFIG

| s21sec Config | | | | | | | | | |
|---|---|---|---|---|---|---|---|---|---|
| General | CustomError | Key | Nodes | Domains | StartPages | ExceptPages | Default | AdminMail | User |

Admin Mail

[_____] [Save] [Reset] [Cancel]

[Save Config] [Cancel]

FIGURE 30

HIVE CONFIG

| s21sec Config | | | | | | | | | |
|---|---|---|---|---|---|---|---|---|---|
| General | CustomError | Key | Nodes | Domains | StartPages | ExceptPages | Default | AdminMail | User |

User

Login: [_____]

Password: [_____] [Save] [Reset] [Cancel]

Confirm Password: [_____]

[Save Config] [Cancel]

FIGURE 31

HIVE CONFIG

| s21sec Config | | | | | | | | | |
|---|---|---|---|---|---|---|---|---|---|
| General | CustomError | Key | Nodes | Domains | StartPages | ExceptPages | Default | AdminMail | User |

User

Login s21sec [Edit]
Password: ********

[Save Config] [Cancel]

FIGURE 32

HIVE CONFIG

| s21sec Config | | | | | | | | | |
|---|---|---|---|---|---|---|---|---|---|
| General | CustomError | Key | Nodes | Domains | StartPages | ExceptPages | Default | AdminMail | User |

User

Login:       s21sec

Password:  ********    [Save] [Reset] [Cancel]

Confirm Password: ********

[Save Config] [Cancel]

FIGURE 33

[Save Config] [Cancel]

FIGURE 34

RESTARTING THE SERVER

/var/Lib/apache/bin/apachectl graceful: httpd gracefully restarted

FIGURE 38

FIREWALLS FOR PROVIDING SECURITY IN HTTP NETWORKS AND APPLICATIONS

CROSS REFERENCE TO RELATED APPLICATIONS

This is application is a Continuation application of U.S. patent application Ser. No. 09/859,123 filed on May 16, 2001, and now abandoned.

FIELD OF THE INVENTION

The invention relates generally to systems and methods for providing security in a network and, more particularly, to systems and methods for providing security in hyper-text transfer protocol (HTTP) networks and applications, such as over Internet.

BACKGROUND OF THE INVENTION

A great variety of devices exist which provide data and/or communication capabilities. One of the most common devices for transmitting and receiving data is a computer. Computers include conventional desk top and lap-top computers as well as Personal Digital Assistants (PDAs) and other hand held devices, such as the Palm Pilot PocketPC, and Visor. Other types of devices are also used to transmit and receive data. For instance, some mobile radiotelephones and two way pagers not only provide voice communication capabilities but also enable the transfer and receipt of text messages and can be used to surf the Internet. In addition to mobile radiotelephones and pagers, enhanced television, WebTV, and other interactive television devices provide data capabilities in addition to displaying television programs. These devices are just some examples of devices which are currently available and which can communicate with other devices.

To enable communications between any two devices, a protocol is employed which defines the manner in which the two devices can communicate. In fact, in a network of devices, a plurality of protocols may be employed at various layers within the network. These layers include the physical layer, the data link layer, network layer, transport layer, session layer, presentation layer, and application layer. For instance, depending the particular layers, the protocol can govern the transmission of bits, handle errors in transmission, define routing of messages within a network, ensure reliability of transmissions, or define the format of the message.

A common protocol associated with the Internet is the Hyper Text Transfer Protocol (HTTP). HTTP is an application layer protocol that allows devices to transfer information over the Internet. For example, web browsers and servers operate HTTP and allow a user to access the World Wide Web (WWW) and a content provider to offer information to end users through a web site in the WWW. HTTP is not specific to any language, although most content providers use hyper-text mark-up language (HTML). Thus, HTTP also encompasses the Wireless Application Protocol (WAP) browsers and servers. For WAP devices, however, the devices use wireless mark-up language (WML) as opposed to HTML.

HTTP is a transactional protocol, meaning that it is based on requests from a client, such as a web browser, and responses from a server, such as a web server. With reference to FIG. 1, a client sends a request to a server with this request identifying a method and a universal resource locator (URL). The server receives the request and processes the URL, such as by obtaining information associated with the URL. For each request from a client, there is a response from the server. Thus, if the request was a request for data associated with a URL, the server would respond by obtaining that data and sending it to the client. The requests include reading a web page, submitting a form, etc. As can be seen from FIG. 1, HTTP is very well defined, has a very simple syntax, and provides a foundation upon which applications can be built to provide services.

Servers may have a number of HTTP applications. Often, content providers need to offer services through their content servers, be it a simple application that will collect feedback from visitors, or a more complex one like a shopping cart or an e-commerce application. All these applications share a common interface based on HTTP that allows a remote client to interact with the underlying resources, such as files, databases, etc., via a web browser. These applications are called HTTP applications, and often are referred to as WWW or Web Applications. Information is passed to HTTP applications in the request, usually setting parameters or cookies with the information provided by the user when filling in a form.

FIG. 2 shows an example web page and its corresponding HTML. The background of this figure depicts a form, a questionnaire, available from a server hosting the domain with the URL http://www.s21sec.com/caste/cuestionario/cuestionario.htm. When a client enters this URL or selects a link associated with the URL, the request is routed to the server, the server retrieves content associated with that URL and possibly performs some additional actions, and then routes a response back to the client. This response includes the html depicted in the notepad. The client browser interprets the html and renders the interface shown in the background.

The HTTP application receives the parameters and process them, sending a response back to the client with the result of the processing. HTTP applications do not depend on the programming languages, just in the interface (HTTP). A HTTP application can therefore be coded in any language, such as but not limited to C, C++, Visual Basic, Perl, or Java. There are well-known mechanisms of interacting with HTTP, such as Common Gateway Interface (CGI), Active Server Pages (ASP), Servlets, PHP, etc, but all of them rely on HTTP for communication between the client and the application.

A network environment is beneficial in that devices can communicate with each other but it exposes the devices and systems connected to the network to security risks. Network security is often regarded as protecting network resources from being accessed to ultimately prevent break-ins into company systems. A firewall is commonly located between the network and a company's system in order to prevent such break-ins. When installing a firewall, a main concern is to filter out ports that could be vulnerable to attacks from the outside.

As mentioned above, HTTP applications enable devices to gain access to a server's resources. For instance, HTTP applications may involve some kind of interaction between the end user and the backend of the company, be it a database server, file access to the server or just access to an email server. These HTTP applications consequently need privileges over these resources so that they can pass through the firewall, access the database, interact with the underlying operation system, etc. Because HTTP applications can provide access to sensitive areas of a company's system, a malicious user can subvert a vulnerable HTTP application and break into the company's resources and compromise their complete business.

A firewall may be ineffective in stopping such attacks. HTTP applications use the same network resources used by content servers, in fact they delegate on the web server to handle network transactions. As long as you need to offer HTTP access to any server, no current firewall can stop a HTTP application level attack. A traditional firewall works at the network and transport layers, but does not offer any kind of application protection. For example, FIG. 3 shows a diagram of a typical firewall 10 installed within a network. The firewall 10 is positioned between a server 12 and clients 8. The firewall 10 provides security to the server 12 on the Telnet and HTTP layers but does not offer any protection to an HTTP application 14.

A traditional approach to application security has been source code review and auditing. Source code review occurs after an application has been finished and involves having someone, often a third party, reviewing all the code and fixing any security problems that are discovered. This process is a never-ending task, as the auditor can overlook security bugs that will end up in the reviewed application, so it is not an assurance of full security. As more and more complex applications are being developed and the time-to-market shrinks in order to be the first to offer a service to customers, source code review is no longer an option, as freezing the deployment of an application for days or weeks means lost of business and revenue. A need therefore exists for systems and methods of providing security in a network, especially with HTTP applications.

SUMMARY OF THE INVENTION

The present invention addresses the problems described above by providing systems and methods offering security on a network. One embodiment of the present invention includes a method for abstracting and embedding security information in a communication from a first entity to a second entity. For example. one such method protects a web server from accepting response data from a client in a format that is not the one the server expects. The method comprising receiving at a security server a communication bound from the first entity to the second entity over a network. For instance, a client may issue a HTTP request to a web server, and in response the web server generates a response and transmits the response to the client. The security server may intercept both the request and the response. The method further comprises abstracting the communication to derive an expected value associated with a parameter in a request associated with the communication. For instance, in an HTTP communication, abstraction may include analyzing the response sent by the web server and determining. for each HTML component, whether the component provides any security information to be taken into account in future request/response transactions. The security components identified are variable and depend on the contents of the page, so the security policy is not based on a predefined number of parameters. Such an embodiment provides transparent tagging at the application level that amounts to a digital "fingerprint" or "watermark".

The method further comprises generating a key associated with the expected value and embedding the key in the communication. The key, which is also referred to herein as a security token or signature, is generated dynamically and, continuing the example above, contains information on the format of the expected messages the web server is willing to receive in future communications from the client. Such a method creates security policies dynamically (with no administrator intervention) based on the contents of each response in a continuous process. The key includes security information abstracted from the data present in the HTTP response and is embedded within the same data, i.e., in the HTML example, the data is embedded within the same data, i.e., in the HTML example, the data is embedded in the HTML page itself. Such an embodiment does not store information about the communication in the security server. The key (security token or signature) is not predefined but generated in real-time and derived from the parameters of the communication. Once the key has been generated and embedded, the communication is transmitted to the second entity, e.g., the client. When the second entity responds, the security server receives the request bound from the second entity to the first entity, i.e., from the client to the web server and determines whether the request is associated with a start page. If not, the security server identifies a key in the request, determine an expected value of a parameter associated with the request based at least in part on the key, and determines the actual value of that parameter. If the actual value corresponds to the expected value, e.g., is in the expected range of acceptable values, the security server transmits the request to the second entity. The systems and methods according to the invention can therefore provide security to IP networks, such as the Internet. Among other things, the invention can be used to block attacks to vulnerable sample applications, content server implementation problems, cookie poisoning, input validation, hidden field tampering, buffer overflows, cross-site scripting, and back door attacks.

BRIEF DESCRIPTION OF THE DRAWINGS

The accompanying drawings, which are incorporated in and form a part of the specification, illustrate preferred embodiments of the present invention and, together with the description, disclose the principles of the invention. In the drawings:

FIG. 4 is a diagram with a security system according to a preferred embodiment of the invention;

FIG. 16 is an example of an edit page for general options;

FIG. 17 is an example of a customer error page;

FIG. 18 is an example of a key options interface;

FIG. 19 is an example of the size of the key in drop-down menu in the key options interface;

FIG. 20 is an example of the life time key drop-down menu in the key options interface;

FIG. 21 is an example of a node configuration interface;

FIG. 22 is an example of an edit node configuration interface;

FIG. 23 is an example of a domain's main page interface;

FIG. 24 is an example of a domain's edit page;

FIG. 25 is an example of a start page main page;

FIG. 26 is an example of a start page edit page;

FIG. 27 is an example of an accept page interface;

FIG. 28 is an example of an accept pages edit page;

FIG. 29 is an example of a default main page interface;

FIG. 30 is an example of an administrative mail page interface;

FIG. 31 is an example of a user page of a new configuration;

FIG. 32 is an example of a user main page;

FIG. 33 is an example of a user edit page interface;

FIG. 34 is an example of configuration control buttons;

FIG. 38 is an example of a restarting page interface.

DETAILED DESCRIPTION

Figures 1, 2:
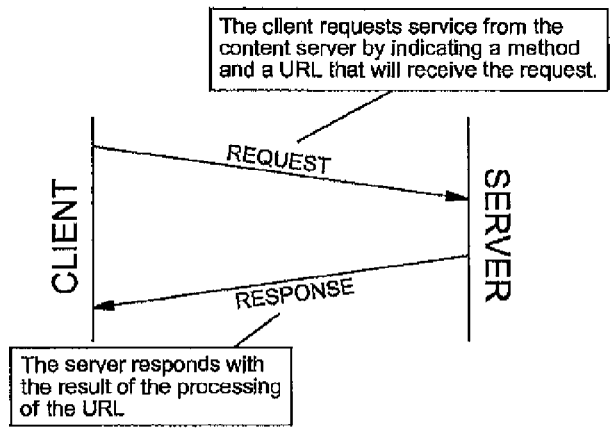
FIG. 1 is a diagram illustrating communications between a client and a server.
FIG. 2 illustrates an exemplary web page form along with its underlying HTML code.
Figure 3:
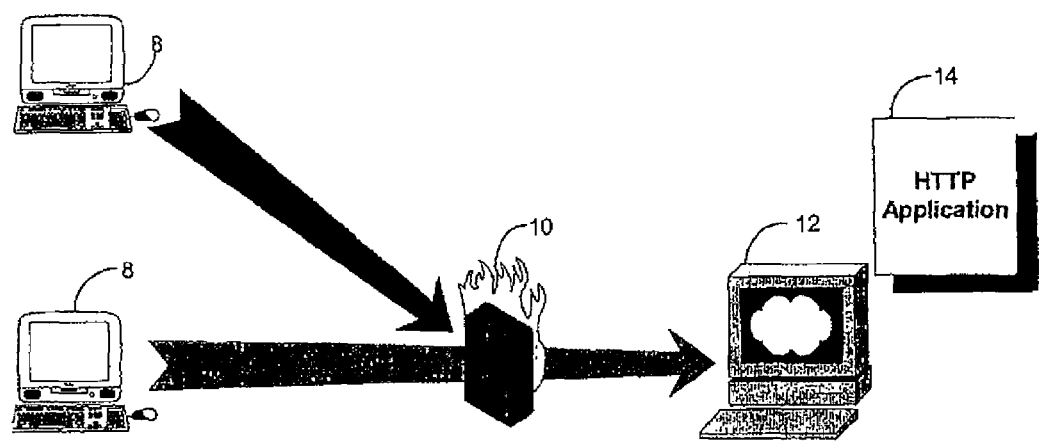
FIG. 3 is a diagram of a typical firewall installation.

Reference will now be made in detail to preferred embodiments of the invention, non-limiting examples of which are illustrated in the accompanying drawings.

I. Overview

The invention relates generally to systems and methods for providing security in a network and with applications. The systems and methods intercept at least some of the requests from clients to a server and also intercept at least some of the responses from the servers to the clients. In general, the systems and methods generate signatures of communications from the server to the client and then check the requests from the client against those signatures. If the requests from the client matches the signature, then the requests are forwarded to the server. On the other hand, when the responses do not match the signatures, the responses are blocked from reaching the server.

For the purposes of this description, the invention will be described with reference to systems and methods that provide an HTTP application firewall. For example, the systems provide security to applications hosted on a server and interfaced to a network via HTTP. Thus, the systems and methods provide security to servers and applications on the World Wide Web (WWW). The invention, however, is not limited to strictly HTTP applications nor to servers connected to the Internet. The invention encompasses systems and methods on other types of networks, the use of protocols other than HTTP, and other types of applications. As other examples, the invention encompasses the Wireless Application Protocol (WAP), Intranets, XML applications, and HDML applications.

By intercepting the responses and requests, the systems and methods enforce the HTTP protocol as defined in Internet standards, disallowing anybody from trying to break the protected applications, such as by malforming requests or modifying legitimate requests. The preferred systems sit between the client and the server and intercept both the HTTP requests and responses and verify that the contents of the request are not malicious. This verification is based in information derived from the content, such as in HTML, derived from FORM fields, etc. Networks and applications can potentially be vulnerable to a number and variety of attacks. The systems and methods according to the invention prevent and provide assistance in deterring many of such attacks.

For example, the systems and methods can protect vulnerable sample applications. A WWW server default installations often include sample pages and applications targeted at showing the server capabilities to a new user. These applications are sometimes vulnerable to attacks, and are actively exploited by crackers. The systems and methods stop access to those pages not directly referred in the website, such as sample applications or files not meant to be published, such as database files, website log files, private documents, etc. too often found on publicly available servers.

As another example, the invention can address content server implementation problems. WWW servers can have implementation problems, such as the recently found IIS Unicode bug or the Iplanet 4.0 shtml buffer overflow. These and other problems can, as will be apparent to those skilled in the art, be addressed by the systems and methods of the invention.

The invention can be used to prevent cookie poisoning. Applications often rely on cookies in order to keep track of user sessions, or to store transient information, such as login or passwords. Modification of these values can lead to security problems, and are stopped by the systems and methods by using the content signing.

Input validation is another example of an application of the invention. Often, an application has to validate all the input it receives from a customer. For example, say an application accepts an email address in a field, but an attacker sends commands that will get executed in the content server. The application has to filter out any bad character by identifying every single point of entry to the application then verifying the client values. The systems and methods of the invention make this task easy and safer by embedding information on the expected values in the page content and by automatically verifying the values when receiving the request from the client.

Hidden field tampering is yet another example of an application of the invention. Applications store session information on "hidden" form fields. These fields are not displayed to an end user but are accessible in the HTML page source code or in the URL bar of the browser so they are easily modified by a malicious user. The systems and methods protect modification of these fields by using the content signatures so they can't be modified and if they are modified an alert is logged and the attack blocked.

Another application of the invention is with buffer overflows. HTML content has a way to force a client's browser to only allow a limited amount of characters to be entered in a form field. This limitation is enforced by the client, but can be easy overcome. Applications that rely on content length limits often present problems of buffer and heap overflows that ultimately allow remote access to the server. The systems and methods detect and enforce the maximum length of a field, and preferably log and block any attacks.

Cross-site scripting is another example of an advantage of the invention. Cross-site scripting is a client problem that consists in fooling a client into believing they are accessing a site while they are really accessing a malicious site. This malicious site can be used to gather user login information, credit card data or just to attack the company name. The systems and methods can address the cross-site scripting problem with invention.

By enabling specific parameters when accessing an application, a backdoor could be accessed, or a debug function displaying too much information triggered, which could allow a remote client to break into the server. The systems and methods disallow extra parameters passed to applications, thereby overcoming the backdoor problem.

The above examples include a limited set of attacks or hacks that the invention can be employed to prevent or at least discourage. As will be appreciated to those skilled in the art, additional attacks or hacks exist today and additional attacks and hacks will be developed in the future that pose a danger to systems. The invention is therefore not limited to the above examples but instead may be adopted to these other types of attacks and hacks.

II. System Diagram

The systems according to the invention can be located in various places between the client and the server. The systems inserts themselves between the HTTP protocol and the HTTP application layers and has the ability to intercept any message between both layers so it is able to enforce the interface between HTTP and the application. For example, as shown in FIG. 4, a security system 20 according to one embodiment of the invention can be physically separate from a server 26 and clients 24. The system 20 receives requests from the clients 24 through a network 22 and also receives any responses from the server 26 before being delivered through the network 22 to the clients 24.

As is apparent from the figure, the invention is not limited in the types of clients but instead encompasses any type of device or system, including but not limited to digital television, enhanced television, WebTV, or other types of interactive television 24a; computers 24b; lap-top computers 24c; Palm Pilot, PocketPC, Visor, or other Personal Digital Assistants and data devices 24d; and mobile radiotelephones, interactive pagers, or other communication devices 24e.

The invention is also not limited in the types of systems or devices for which the system 20 provides security or protection. In a common application of the invention, the system 20 is intended to be used with a server 26. The invention, however, is not limited to a client-server environment but instead encompasses peer-to-peer communications, distributed computing, or other network environments.

FIG. 4 illustrates the system 20 as a stand-alone system separate from the server 26 and network 22. The system 20 can be implemented as a network appliance that sits just in front of the web server 26 and works as a proxy server. This standalone version of the system 20 is recommended where performance is an issue or where there is a large number of domains or web servers 26. Setting up the standalone version requires network topology changes, as it has to be set up as a proxy of the HTTP servers 26. The system 20 includes one or more computer-readable storage devices. The term "computer-readable storage device" does not encompass a signal propagation media such as a copper cable, optical fiber and wireless transmission media.

The system 20 is not limited to a stand-alone system but instead can positioned anywhere in the network where the system 20 can intercept requests and responses. In the client-server environment, the system 20 can be located anywhere the system 20 can intercept transmissions between the clients and the servers, check the transmissions for any malicious request that could result in an illegal access, and take appropriate action. As another option, the system 20 can be co-resident with the server 26 itself as a content server module version. In this example, the system 20 can be implemented as an extension to an HTTP server, such as IIS, Netscape/Iplanet, and Apache. The system 20 installs in the same machine as the HTTP server and needs no special network configuration in order to work. This configuration of the system 20 is recommended where there are a limited number of domains and servers or where maximum performance and throughput is not needed. Also, this configuration is easier to set-up as it does not require any network topology changes. As a further option, the system 20 can be implemented as part of the network 20 and/or as part of the devices 24.

III. Content Signing

As mentioned above, systems according to the invention take responses from servers, requests from servers and generates a signature. This signature is then used in deciding if a subsequent request from a client is safe. Preferred methods for processing responses and requests will now be described with reference to FIGS. 5(A) and 5(B).

A. Response Processing

Figure 5A:
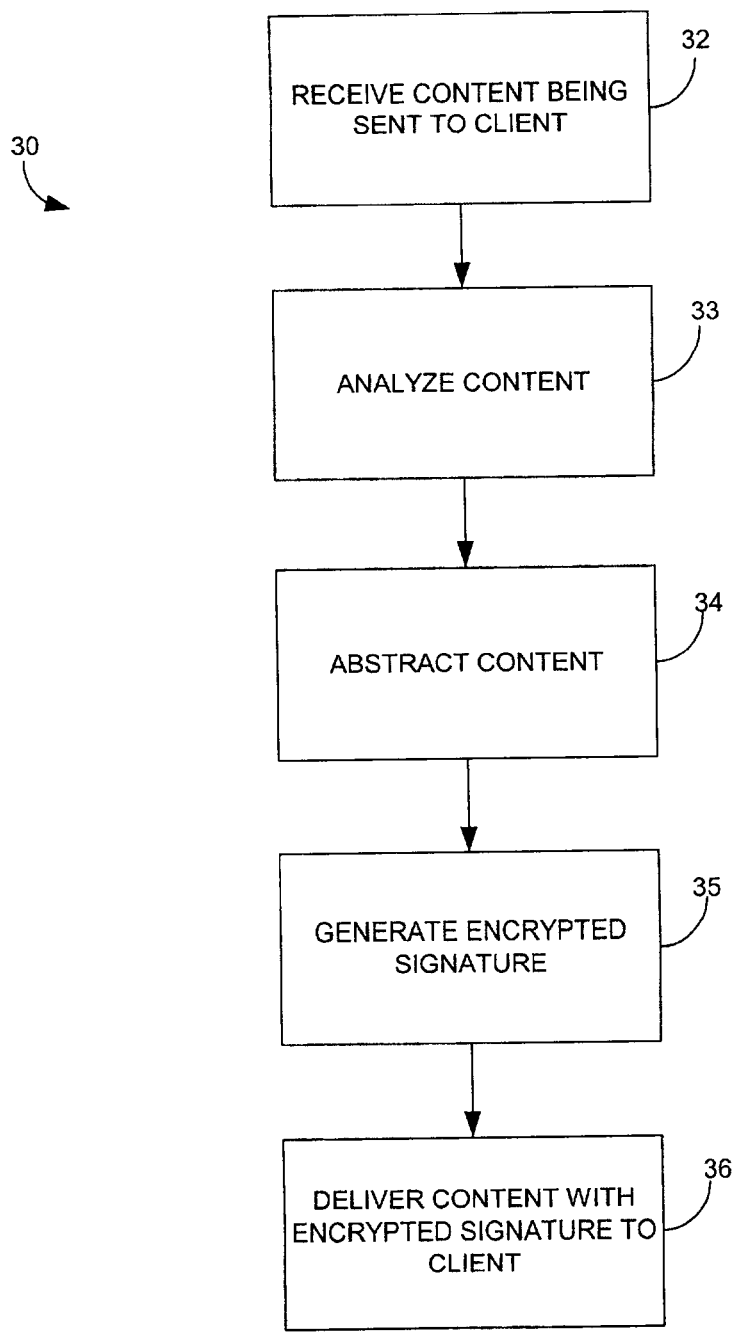
FIGS. 5(A) and 5(B) are flow charts of methods for processing responses to clients and requests to servers, respectively.

A flowchart according to a preferred method 30 of intercepting responses is depicted in FIG. 5(A). At 32, the system 20 receives content being sent to a client 24. Typically, server 26 delivers the content in response to a prior request received from the client 24. The invention, however, is not limited to servers 26 that only respond when requested but can also be used with servers 26 that automatically deliver content without any preceding request. At 33, the system 20 analyses the content that is being sent to the client 24. Next, the system abstracts the content and generates an encrypted signature at 35 based on that abstraction. This signature is specific for a particular piece of content or set of content, such as a page with certain prescribed fields and values. The system 20 encrypts the signature at 35 to prevent the client 24 from modifying the signature, thereby to disallow the security measures. Once the signature is encrypted, at 36 the system 20 sends the content with the encrypted signature the client 24.

The entire method 30 and system 20 are preferably transparent to both the server 26 and the client 24. In other words, the server 26 operates in the same manner it does without the method 30 being performed and without the system 20 being interposed between the server 26 and the clients 24, whereby preferably no modification needs to be made to the server 25 or any of its applications. The method 30 and system 20 are also transparent to the clients 24 whereby the clients 24 see no difference in operation.

B. Request Processing

Figure 5B:
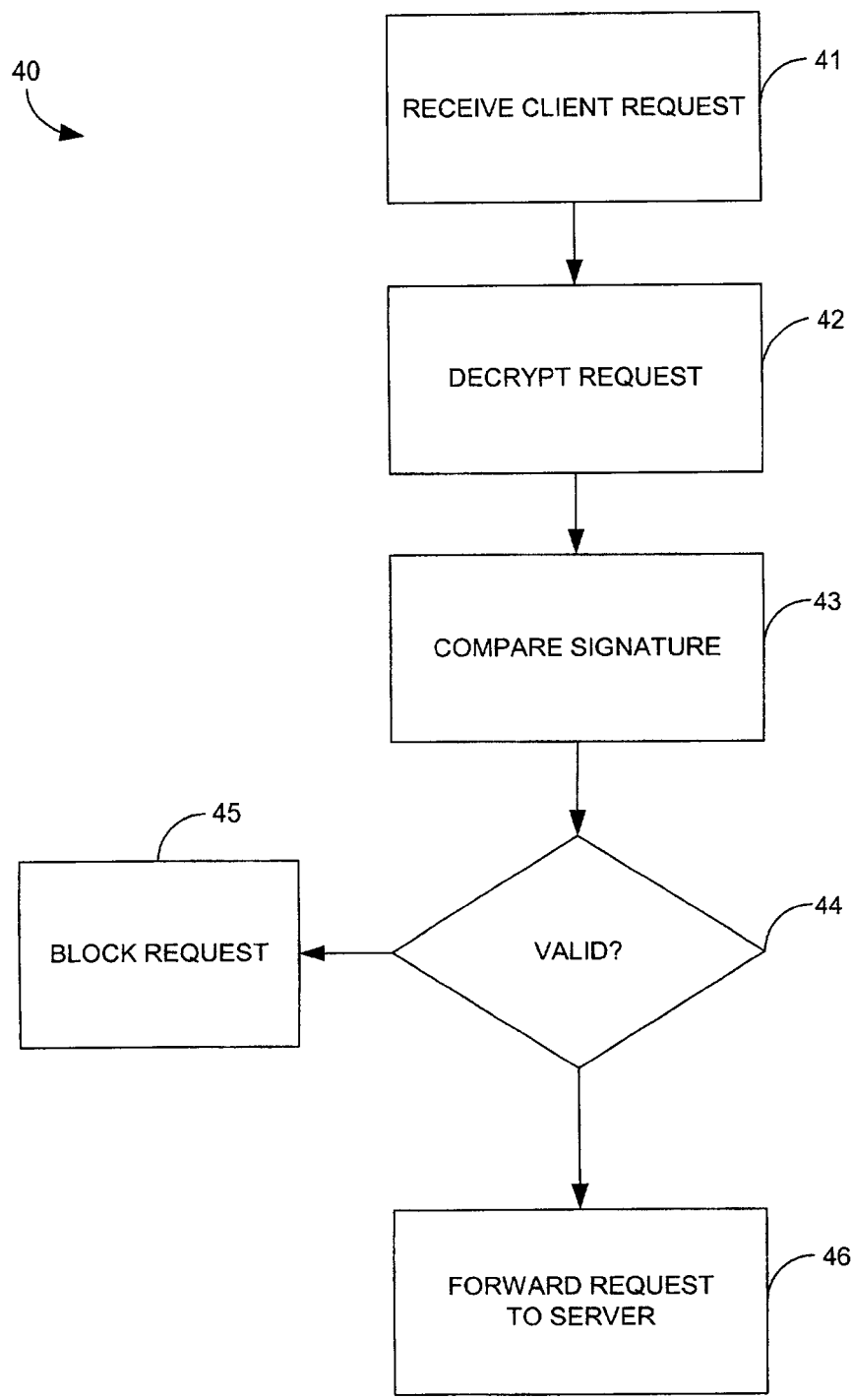

A preferred method 40 of processing requests from clients 24 will now be described with reference to FIG. 5(B). The method 40 begins at 41 with the server 26 receiving a client request. As will become more apparent from the description below, at least some but not necessarily all of the requests will trigger the method 40. When the method 40 is triggered, at 42 the system 20 will intercept the request, decrypted the request, and derive the signature. At 43, the system 20 compares the signature encrypted with the request to the contents of the request itself. During normal operation with no alteration of the request, the signature will correspond with the contents of the request. In such a case, at 44, the system 20 server determines that the request is valid and at 46 forward the request to the server 26 for processing. If, on the other hand, the request has been tampered, then at 44 the system 20 finds that the signature and the request do not correspond and will block the request at 45.

C. Content

As mentioned above, at 32 the method 30 involves receiving content that is being delivered to the client. By analysing the content, the system 20 determines if a subsequent request from a client 24 is valid. The system 20, however, need not analyse all content being delivered to clients 24 and in fact preferably omits some responses.

For example, the system 20 preferably does not sign responses from the server 26 where clients 24 can begin communications with the server 26. In a WWW server 26, these responses might be associated with a home page or other pages where clients 24 should be able to visit freely and which offer low risk of an attack. In the preferred embodiment, as will be described in more detail below, the system 20 allows an administrator to set up certain URL resources as "Start Pages," meaning that in order to access the resource no signature is needed. Start pages should be configured to be those pages in the website structure that a client 24 can access directly, such as by typing them in the URL bar of a browser, through links available at other sites, or by using bookmark features. These pages include the main welcome or home page, the main page for departments, etc. Because access to Start pages is not restricted, an application should not be designated as a Start page since it will not benefit from the protection of content signing.

As another example, in the preferred embodiment the administrator can designate some content as Exception Pages. As with the start pages, setting up URL resources as "Exception Pages" will cause the system 20 to deliver these pages to clients 24 without any content signing. An Exception page is well-suited in those set-ups where some content is out of the control of the organization, such as in an ISP arrangement where users can modify their own web pages. In these types of situations, signing of those pages could compromise security as a malicious user could publish a web page with links to malformed requests that could lead to application security problems.

The system 20 preferably prevents access to pages not directly referred from within the content server, or configured as start pages. Thus, if a content server 26 installs applications and sample content that the administrator does not know is there, the system 20 automatically blocks access to such sample content A malicious user is therefore blocked from accessing "sample" pages or applications installed during the content server set-up which, if found vulnerable, are the most widely used kind of attack against content servers 26.

D. Analyse and Abstract

As mentioned above, the system 20 intercepts the response from the server 26 to a client request, analyses the response, and abstracts the response. By analysing and abstracting, the system 20 can generate a signature for that response and later determine if a client request is valid. Abstraction involves identifying important parts of the content from which the signature can be generated. This signature describes fields and values present in the page.

The system 20 can perform this analysis and abstraction in a number of ways. In the preferred embodiment, the system 20 analyses entry points in the content, such as in forms, input fields, etc. and signs them by creating a unique signature that is inserted into the response on-the-fly. This signature is guaranteed to be unique and un-modifiable by encrypting before the system 20 inserts it in the content. The system 20 then relays the page to the client 24 in a process totally transparent to the content designer and to the end user. The content designer does not need to alter its design in order to allow the system 20 to work, nor will the end user see a change on the appearance of the page. It should be understood that the system 20 may determine that other portions or aspects of the response are important and use those other portions or aspects in generating a signature.

E. Encryption

To prevent signature tampering by a malicious user, the system 20 uses encryption in the signature process. When a request is later received, the system 20 decrypts the request to obtain a plain text version of the signature. This signature is then compared to the contents of the request itself in validating the request. The system 20, for example, can compare signature to the type, value, length and cardinality of the request.

While the invention may use any suitable type of encryption, the preferred algorithm is the well-known American Encryption Standard AES adopted as the current secure cipher level by the NSA. The system 20 offers 128, 192 or 256 bit encryption, providing different levels of security at the expense of some efficiency related to the cipher processing. The user can also choose a lifetime for the key, resulting in reduced time frames for a possible, wide-scale, cracking effort against a cipher text. Each configuration of the system 20 has its own key, avoiding security problems related to shared keys. The system 20 allows an administrator to generate keys or to enter them manually from within the configuration interface. Since AES was developed outside of the US, it is not restricted by the US encryption export laws.

F. Comparison

The system 20 generates the signature of the response at 35 and delivers the response with the encrypted signature at 36. Later, when a request is received from a client 24, the system 20 compares a signature associated with the request to the request. For example, once a user processes a page and accesses an HTTP application at the server 26, such as by submitting a form, following a link, etc., the client 24 sends a request including the signature to the content server. Before the request is delivered to the server 26, the system 20 intercepts the request and performs the comparison.

In general, the request is validated based on the expected variables and values and the actual content of the request. If the input matches the expected values, the system 20 provides the request transparently to the HTTP application that will process it. On the other hand, if for any reason the input in the request does not match the expected values, the system 20 blocks the request at 45. In blocking the request, the system 20 may generate a configurable informative error and send this error to the user. The system 20 may also enter the event in an illegal access entry log and optionally providing real-time alerts to an administrator.

The system 20 validates input based on the original content information to detect malicious or invalid responses. One way in which the system 20 validates the input is by examining variable count and names to ensure that an application receives exactly the number of variables it is expecting and stopping any access to unknown application functionality, as debug functions or backdoors. The system 20 also checks the value of content. If values are enforced in the page, such as by using "hidden" fields, configuration options, etc., then the system 20 checks to see if they are present in the client request. The system 20 validates the value length of the content in the request. If the content designer enforced a content length, the system 20 validates that the input conforms to that maximum length. If the length was not specified, the system 20 enforces a configured default length to prevent attacks based on buffer or heap overflows. The system 20 monitors the destination URL and allows a client 24 to access to only a designed set of URLs. The system 20 only verifies for these intended URLs so a user cannot jump from one URL to another without the proper permissions.

Advantageously, the system 20 does not use cookies in order to track users, all the information needed its embedded in the page sent to the client. As a result, no special configuration is needed on load balancers or user browsers in order to work with the system 20. Also, any privacy concern that could have been raised because of the use of cookies is avoided because the system 20 itself does not use cookies.

While the system 20 does not employ cookies in the content signing, the system 20 nonetheless is operable with servers 26 and applications that do employ cookies. The system 20 can perform cookie signing and validation. When an HTTP application sets a cookie on the end user browser, the system 20 intercepts the corresponding HTTP header and signs it, allowing for integrity checks on the cookie once it is sent back to the server in future requests. By signing the cookies, the system 20 prevents a user from modifying cookie contents and thus stops attacks based on cookie poisoning.

IV. Operating Environments

As mentioned above, the system 20 is not limited in the types of devices 24 nor in the types of systems 26. In the discussion of this document, the environment is a client-server environment with the devices 24 being clients and the system 26 being a server. The system 20 is not limited to a single server 26 but instead supports multiple servers. By signing the page content, the system 20 does not require any special configuration to allow for fault tolerant redundant systems, where more than one system 20 is present or where load balancers are in place. In fact, multiple systems 20 may be deployed in the same domain if all systems 20 share the master key.

The system 20 does not have a limit on concurrent user sessions or requests. The system 20 also does not require an excessive amount of memory in order to accommodate user details, as it distributes authentication information amongst servers and clients. The system can therefore run in a network with no added requirements, be it a low end PC or an embedded system where resources are expensive and limited. This feature, and since the system 20 does not make use of cookies or any other special function on the client side, makes the system 20 a "plug and play" technology for use in any network device that has the capability of intercepting traffic, be it a traditional Firewall, a load balancer, a HTTP proxy/accelerator, etc.

The system 20 supports additional measures of security, such as Secure Socket Layer (SSL), both in the server module and standalone versions. The system 20 transparently handles SSL connections by hooking itself between the SSL and the application layers, so no special configuration is required to work in SSL environments. In the standalone version, the system 20 decrypts SSL messages as it sits between the server 26 and the client 24. The system 20 automatically handles this conversion by using the secure web server SSL certificate in order to decrypt the traffic between client 24 and server 26.

Sometimes, client side applications, such as Javascript, VBScript, Java, and Flash, interact with HTTP applications located in the server 26. These applications often manipulate URLs or form values after the server 26 has sent them to the client 24. When the client 24 sends this request, the system 20 detects manipulation in the request and refuses to pass the request to the application. In order to allow for such applications, the system 20 can be configured to offer two security levels for client side applications. At a low level, the system 20 accepts requests where the content of variables has been modified, as long as the modifications do not go over the predefined maximum length. At a high level, the system refuses to accept any request that has been modified at the client side, except for those variables and values defined in configuration or tagged in the page with tags. Due to the nature of client side applications, it is often impossible to know beforehand when the signature is created how the user will interact with the application and what values will be sent. The system 20 therefore alters the way it provides security to pages that embed client-side applications which cannot be verified in the usual way.

By design, the system 20 integrates transparently in a customer network; taking advantage of the resources already in place. The system 20 may be used with load balancing or high availability with no need for reconfiguration. In the event that the system 20 or associated HTTP server went offline, no steps are required in order to synchronize state information with other systems 20 running in a cluster configuration, as information is automatically distributed amongst servers and clients during normal operation. Thus, no request will be lost or affected by latency due to synchronization, even in the event of the system 20 going offline. When the system 20 comes back up, the system 20 will automatically receive the latest configuration from the other nodes and will start to operate securely as from the first request.

V. Logs and Alerts

The system 20 preferably maintains a log of events, such as a log of all invalid requests received from clients. The system 20 preferably logs all illegal access requests to a human readable log accessible through the web. Additionally, the system 20 can issue alerts or warnings. These alerts may be issued in a variety of ways, such as via e-mail, pager, or other text or voice messaging. The real-time alerts can warn administrators when illegal attempts are being performed whereby the administrator can take appropriate action to counter such attempts. Any illegal access attempt blocked by the system 20 can be a real attempt, as modification of requests require a work on the malicious user side. The system 20 consequently issues no false positives in the log, just plain application attacks blocked by the system 20.

VI. Customization

The system 20 can be implemented according to the desires of a customer. In other words, the system 20 preferably can be customized for a particular environment according to the desires of a customer. The system 20 allows for a lot of customisation and security settings.

The system 20 also offers a "plug and play" configuration option which allows a user with no security knowledge to provide security to the applications hosted on its site, with no need to configure any settings. This "plug and play" configuration is intended for systems 20 protecting multiple domains, such as in a hosting company, where the task of updating and protecting content is outside of the scope of the administrator, leaving that task to the end-user, a user that doesn't necessarily have the knowledge to configure the system 20. According to a preferred set of "plug and play" configuration security settings, the system 20 only signs objects that will access an application, which includes forms and links where parameters are passed. The system 20 does not protect pages nor does it check for signatures where no arguments are involved. This setting allows a server to protect its applications without having to set up start pages. The system 20 does not protect cookies, in order to protect cookies the cookie section of the configuration must be defined. Client side scripting security settings will be set to "LOW," allowing most of Javascript applications to work while protecting server side applications.

The "plug and play" configuration is desired in situation such as the hosting environment but is not ideal for many other situations. For example, the system 20 should not be in a "plug and play" configuration when maximum security is required. The "plug and play" configuration defines a set of security settings, but is no substitute of a properly customized server. The "plug and play" configuration is also not recommended when page content is out of the scope of the organization, such as an ISP that offers web hosting to its users. In this set-up, the Except Pages are recommended as a malicious user could use web access to create pages that, once signed, will allow him to subvert application security.

VII. Server Side Tags

Server side tags, allows an intermediate application that is screening the content of a web page, to take action based on the content of the tags. These tags are embedded in the web page content by the document author, and are not interpreted by the web browser, but detected and interpreted by an intermediate application such as the system 20. The system 20 uses server side tags in order to "mark" content elements that could be modified by client side applications, maximizing the security of the application.

A server side tag example could be:
<INPUT TYPE="text" NAME="address" CLASS="hive_email">
This tag won't be interpreted by the client browser, but by the system 20 itself, that will perform its processing based on the value of the tag.

VIII. System Architecture

Figure 6A:
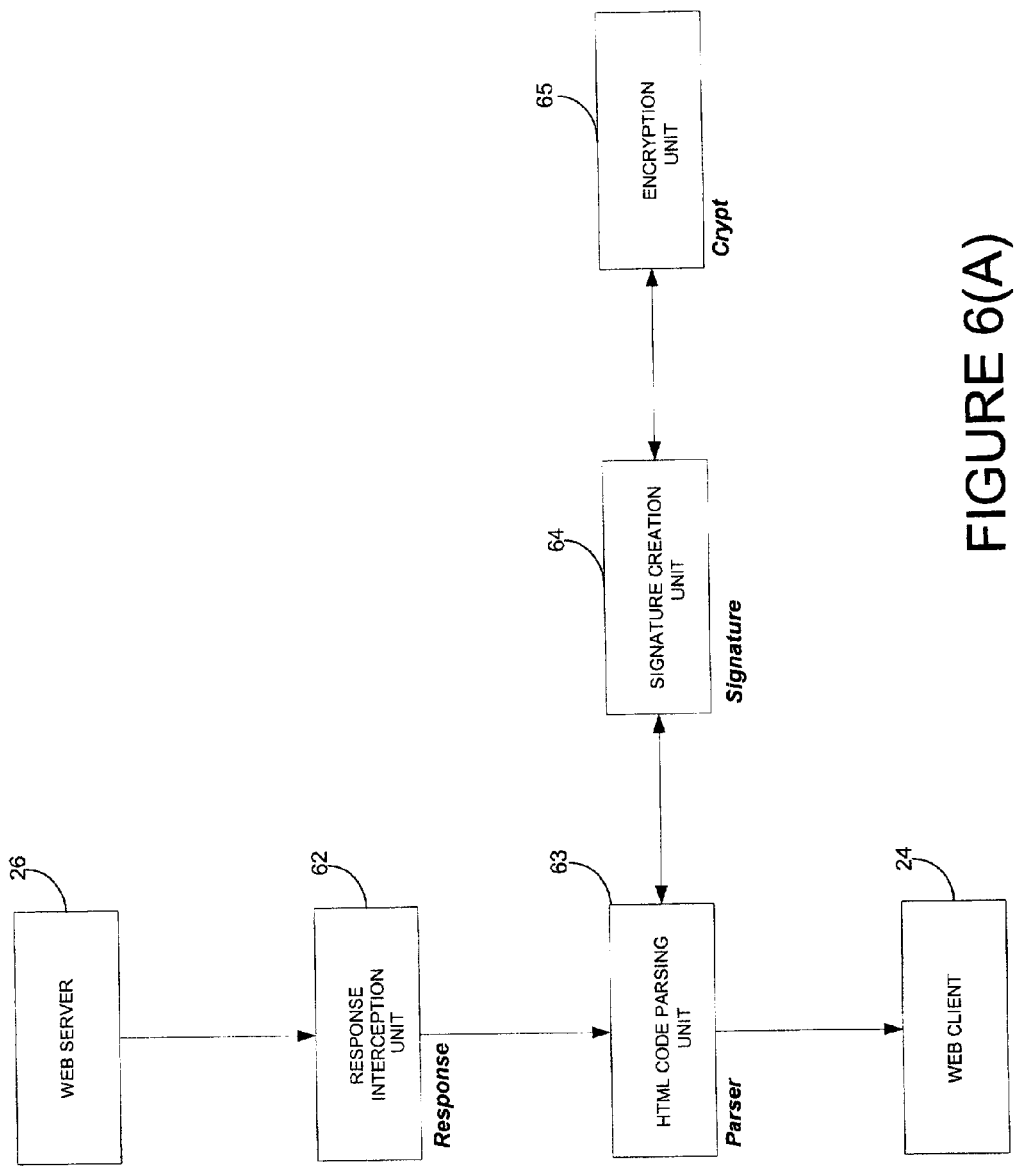
FIGS. 6(A) and 6(B) are more detailed block diagrams of response processing and request processing, respectively.
Figure 6B:
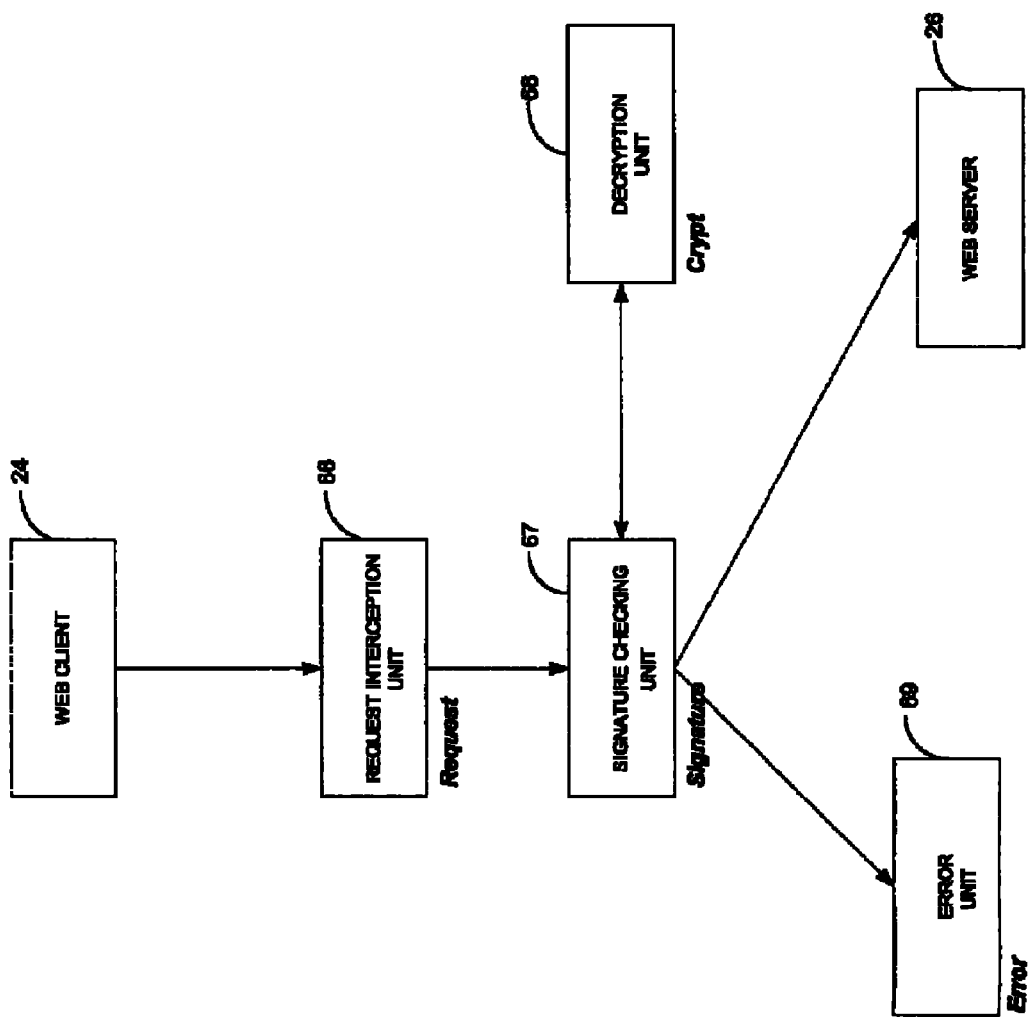

A preferred system architecture for the system 20 will now be described with reference to FIGS. 6(A) and 6(B). With reference to FIG. 6(A), a response interception unit 62 receives a response from the webserver 26. The response interception unit 62 passes the response first to a parser, such as the HTML code parsing unit 63. The parser 63 performs the analysis and abstraction of the response to derive important fields. These fields are passed to a signature creation unit 64 which creates a signature for that response. An encryption unit 65 encrypts the signature along with the response and, together, the response and encrypted signature are passed to the web client 24, such as through the Internet.

When a request is received from the web client 24, a request interception unit 66 receives the request and sends it to a signature checking unit 67. The signature checking unit 67 employs a decryption unit 68 for deriving the plain text version of the signature. The signature checking unit 67 then compares the signature against the content of the request itself. If the signature checking unit 67 validates the request, then the signature checking unit 67 forwards the request to the web server 26. If the signature checking unit 67 invalidates the request, then the signature checking unit 67 sends the error to an error unit 69. The error unit 69 maintains a log file of all errors and may also generate alerts based on the error received. The error unit 69 may forward these errors to an administrator or other appropriate personnel, such as through e-mail or pager.

Figure 7A:
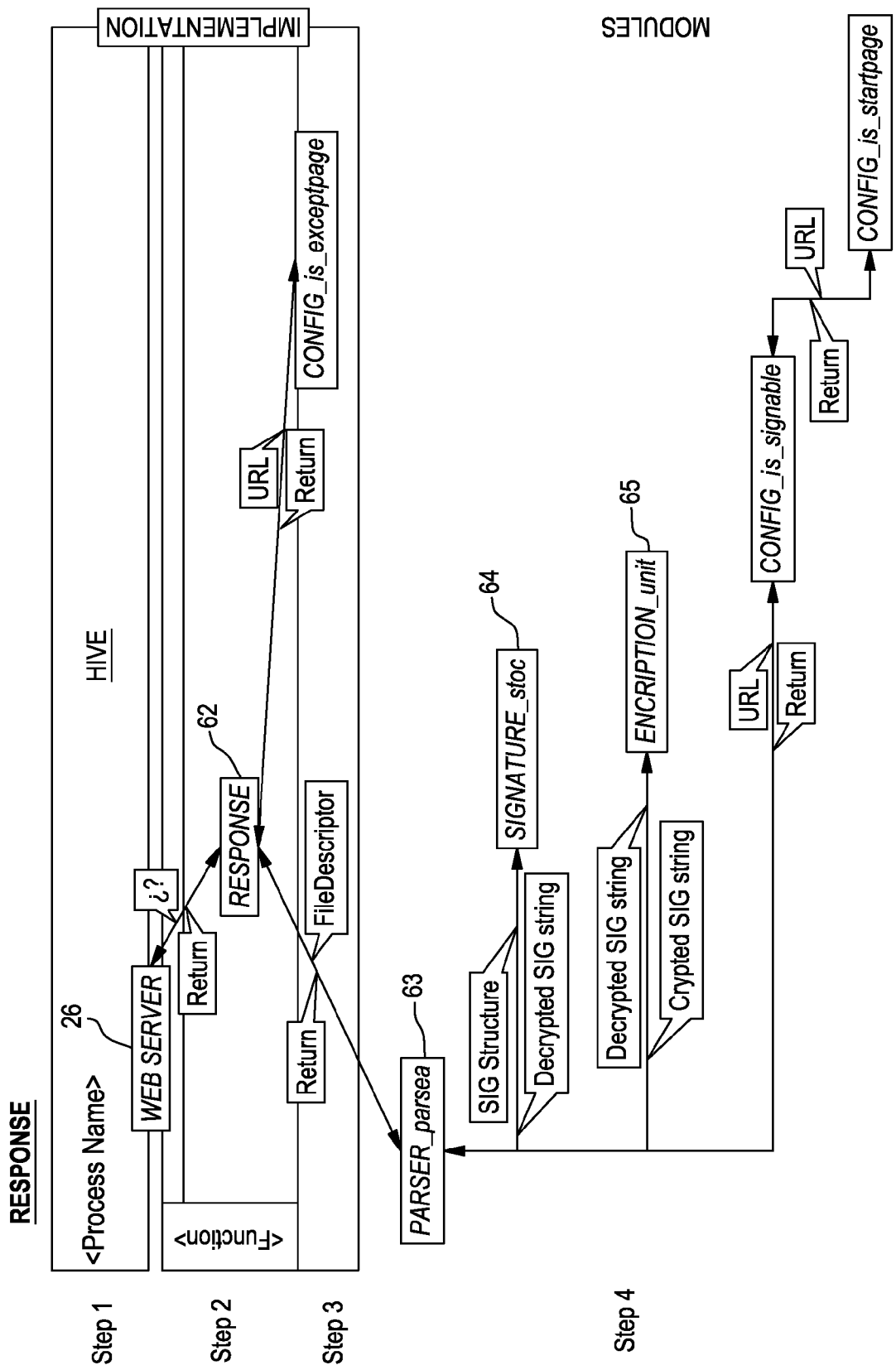
FIGS. 7(A) and 7(B) are process flow diagrams for a response and request, respectively.

A more detailed flow diagram of the response processing is shown in FIG. 7(A). The system 20 receives a response from the web server and determines if it is an accept page. If it is, then the processing terminates. If the page is not an accept page, then the parser uses the signature creation unit 64 and encryption unit 65. The processing shown in FIG. 7(A) also involves determining if the response is signable and if it is a start page.

Figure 7B:
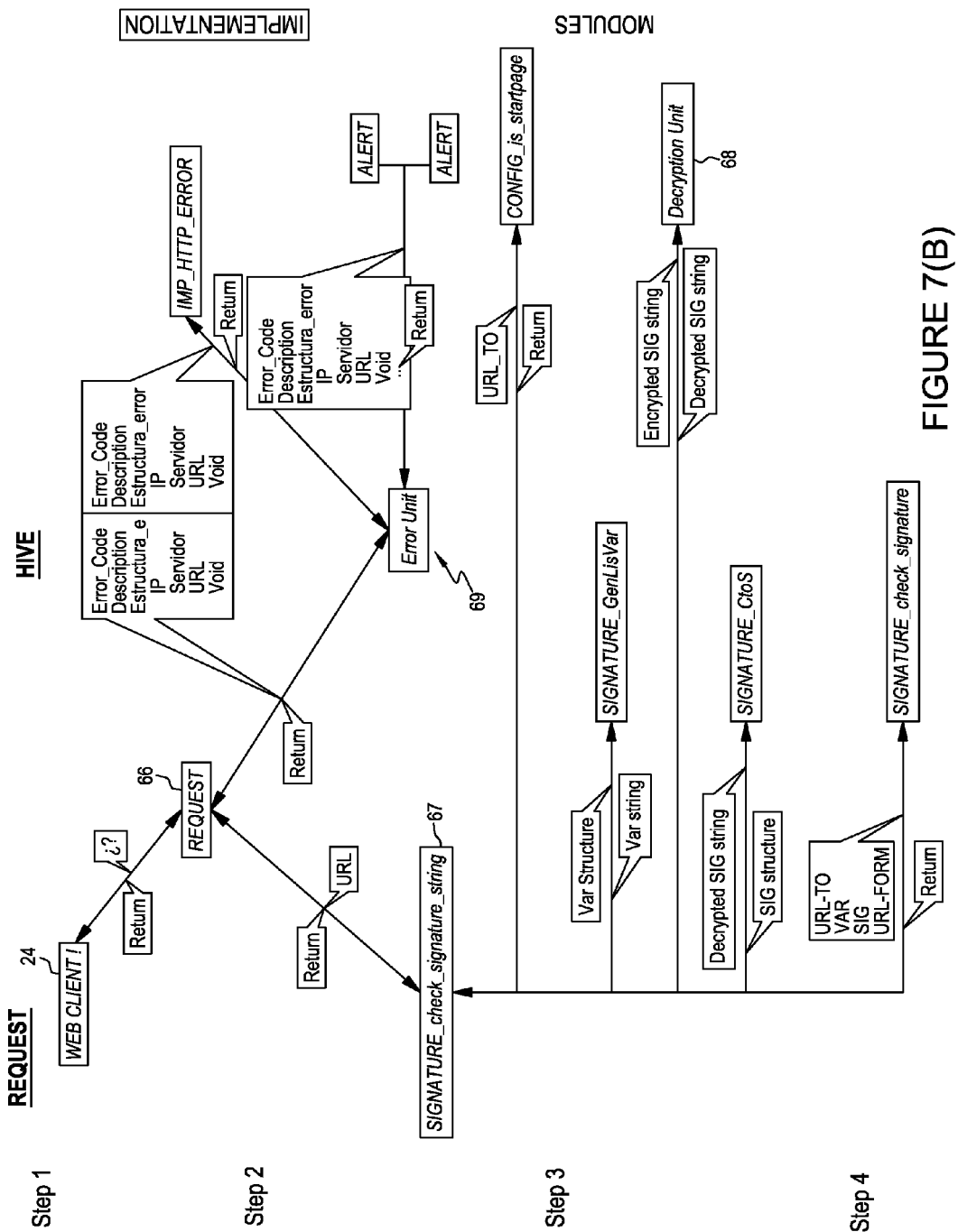

With reference to FIG. 7(B) the processing of a request involves receiving the request from a web client at the request interception unit 66 and then sending the request to the signature checking unit 67. The signature checking unit 67 checks whether the request involves a start page and, if not, then employs the decryption unit 68 for deriving the signature. The signature checking unit 67 then checks values, variables, strings, and lengths of the request against the signature. In the event of an error, the signature checking unit 67 forwards the error to the error unit 69.

IX. Examples

Figure 8:
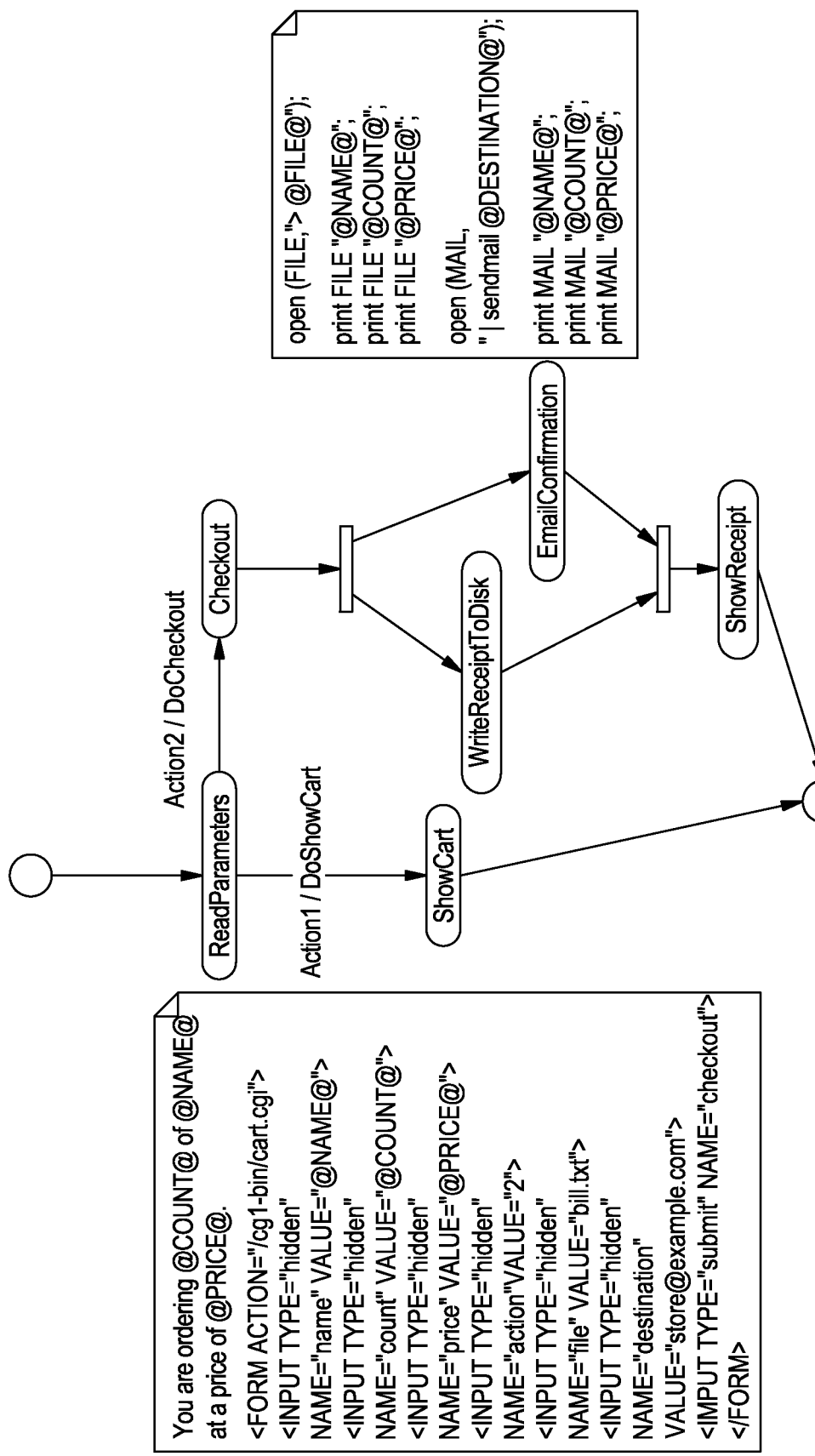
FIG. 8 is a flow diagram of a checkout section of an application.

Some examples will now be provided as to how the system 20 can be used to provide security to HTTP applications. The execution of a shopping cart application that allows a user to buy things through the web will be used in these examples. The shopping cart application is located at http://www.example.com/applications/cart.cgi. This application is quite simple and we will only be seeing the checkout section. The application follows a flow diagram shown in FIG. 8. When the user makes a request with the "action" parameter set to "1", the application displays a FORM with the number, name and price of the items in its shopping cart as well as a "Checkout" button that will allow him to be billed.

An example of some html associated with the application is as follows:

```
You are ordering @COUNT@ of @NAME@ at a price of @PRICE@.
<FORM ACTION="/cgi-bin/cart.cgi">
<INPUT TYPE="hidden" NAME="name" VALUE="@NAME@">
<INPUT TYPE="hidden" NAME="count" VALUE="@COUNT@">
<INPUT TYPE="hidden" NAME="price" VALUE="@PRICE@">
<INPUT TYPE="hidden" NAME="name" VALUE="@NAME@">
<INPUT TYPE="hidden" NAME="file" VALUE="bill.txt">
<INPUT TYPE="text" NAME="destination" VALUE="">
<INPUT TYPE="submit" NAME="Checkout">
</FORM>
```

The values enclosed in "@" represent the actual values of each variable. When the user clicks on the "Checkout" button, the application receives a request with the "action" parameter set to "2" and a list of items to bill the user for, in the "name," "count," and "price" variables. The application writes a receipt to disk, emails the receipt to the merchant, and displays a confirmation message.

The following depicts a WriteReceiptToDisk function, which takes the variables sent by the customer in the previous form (file, name, count and price) and writes them to disk, and an EmailConfirmation function, which takes the variables sent by the customer in the previous form (destination, name, count and price) and sends them via email to the address specified in the "destination" parameter:
WriteReceiptToDisk:

```
open(FILE,"> @FILE@");
print FILE "@NAME@";
print FILE "@COUNT@";
print FILE "@PRICE@";
```

EmailConfirmation:

```
open(MAIL, "| sendmail @DESTINATION@");
print MAIL "@NAME@";
print MAIL "@COUNT@";
print MAIL "@PRICE@";
```

The application, even being this simple, presents a number of security vulnerabilities that could be used by a malicious user. For example, through this application, a malicious user can obtain customer details, write arbitrary files on the web server, execute commands on the web server, and make false order bills. The following examples of the system 20 explain how such security vulnerabilities are addressed.

A. Obtaining Customer Details

Figure 9:
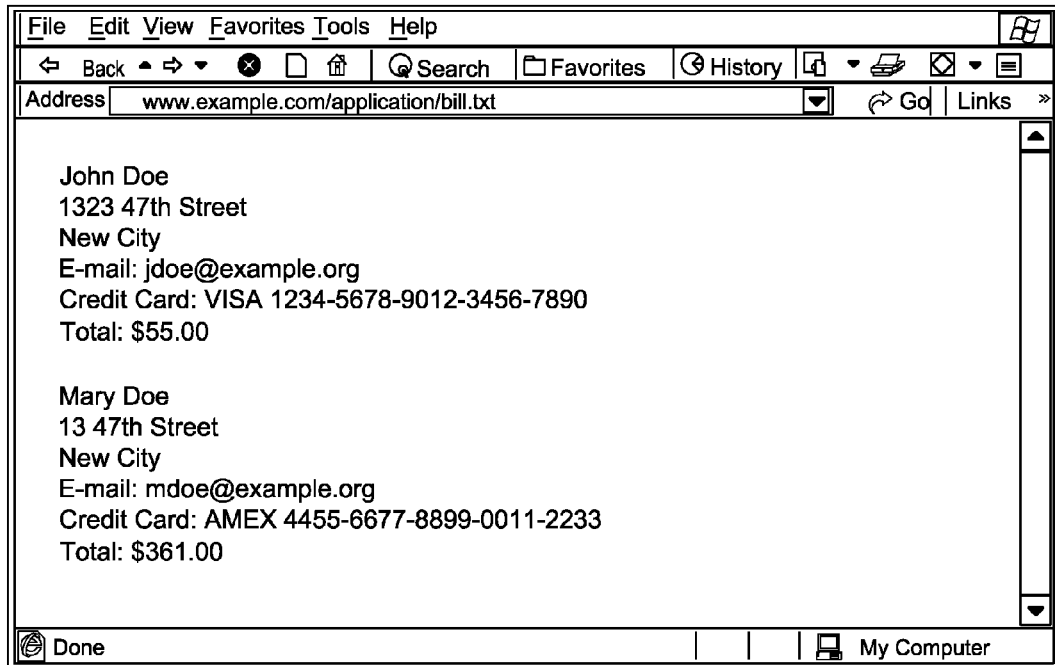
FIG. 9 is an example of an interface provided to a user obtaining customer details.
Figure 10:
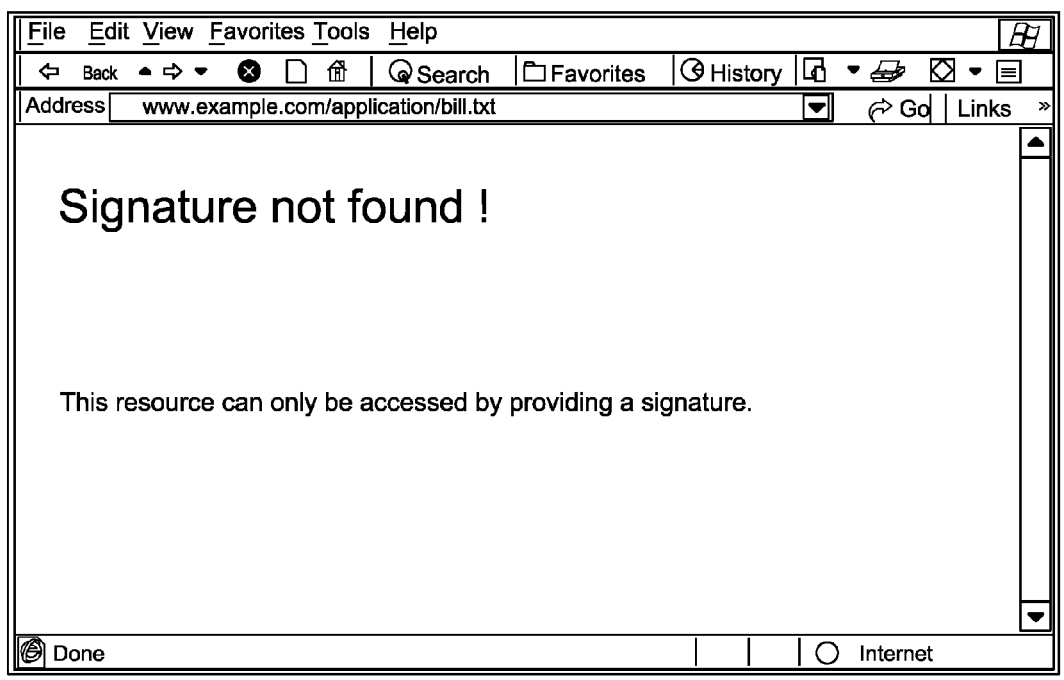
FIG. 10 is an example of an interface provided to a user from a block of an attack seeking customer details.

The application writes to a log file each transaction, including personal details on the customer, etc. The name of this log file is included in the form sent to the user and thus is visible to a malicious user just by reading the source code of the HTML page. Accessing customer details is as easy as prefixing the name of the logfile, which is "bill.txt," to the server pathname, such as with the following:
http://www.example.com/application/bill.txt
Even if the filename was not shown in the web page, a malicious user could take advantage of server problems in order to find out the filename, or just guess it. FIG. 9 illustrates how an attack to a server not protected by the system 20 can be used to obtain customer details. In contrast, the system 20 stops these kind of attacks by requiring a signature in order to access any web page, except for the start pages. Consequently, a malicious user is not allowed to access an arbitrary web page on the server, such as order files, hidden data files, vulnerable samples, etc. without the proper signature. An example of an interface returned to a user as a result of the attack is shown in FIG. 10. As explained in this interface, the resource requested by the user cannot be accessed without the proper signature.

B. Arbitrary File Writing

The system 20 can also prevent arbitrary file writing, which occurs when an application writes to a log file each transaction. The name of the file data is written to is embedded in the form sent to the client and is passed as a user request parameter to the application. A malicious user could modify this parameter in order to point to a different file, effectively writing the order details to any file on the file system. A particularly telling illustration of the severity of this kind of attack is that the application could potentially be directed to overwrite the homepage of the server.

Figure 11:
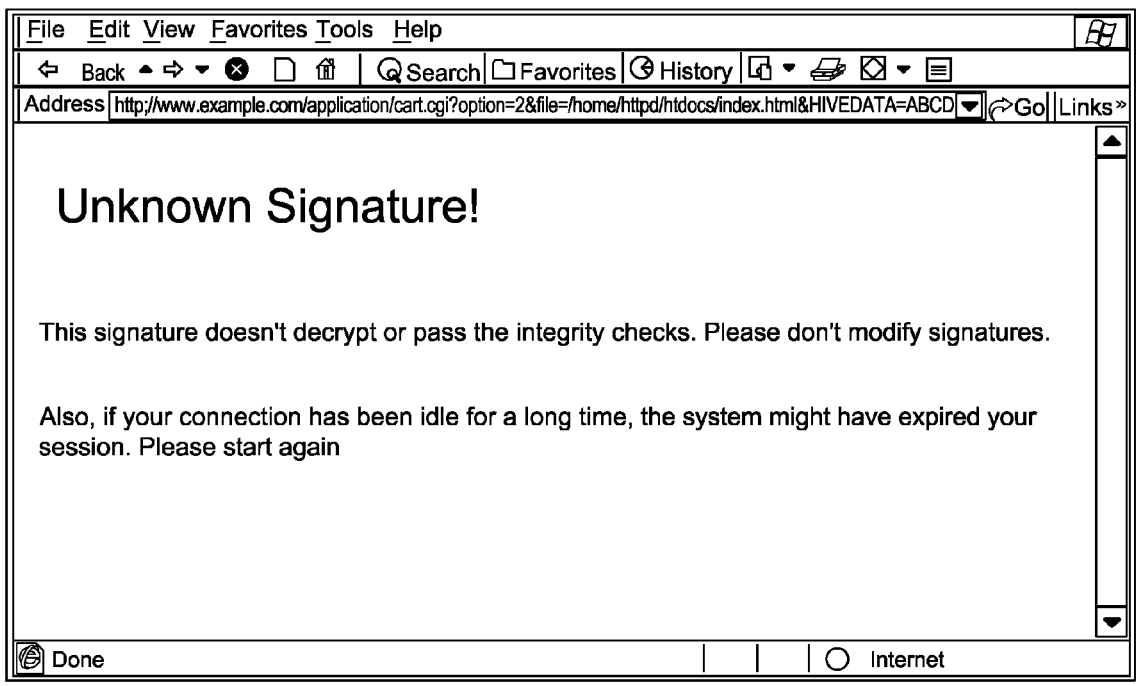
FIG. 11 is an example of an interface provided to a user as a result of a block of an attack seeking an arbitrary file writing.

The user could request the data to be written to file "/home/httpd/htdocs/index.html," by requesting a URL like:
http://www.example.com/application/
    cart.cgi?option=2&file=/home/httpd/htdocs/index.html
If the system 20 is in use, the form includes a signature that describes the FORM data and values abstraction. For example, the form may include the HIVEDATA having a value of ABCD, as shown as:
http://www.example.com/application/
    cart.cgi?option=2&file=bill.txt&HIVEDATA=ABCD
If a user tries to modify the request parameters, such as by replacing "bill.txt" with "/home/httpd/htdocs/index.html," the request would be as follows:
http://www.example.com/application/
    cart.cgi?option=2&file=/home/httpd/htdocs/
    index.html&HIVEDATA=ABCD When the system 20 decrypts the signature, the system 20 will detect that the parameters associated with the request do not match that of the signature. As a result, the system 20 will invalidate the request due to tampering and stop the request from getting to the application. An example of an interface provided to the user in the event of such tampering is shown in FIG. 11.

The system 20 stops these and other types of attacks by requiring a signature in order to access any web page, except for the start pages. The signature includes information on the number and acceptable values of the user request parameters and, on receipt of a request, the system 20 checks the signature against the actual values. If the system 20 finds that an attempt to tamper the parameters occurred, the system 20 sends an error message to the user, logs the illegal access attempt, and optionally relays the error to the administrator.

C. Remote Command Execution

Some applications are able to be execute remotely commands. For example, an application may send an email to the merchant once the checkout has been completed. The application insecurely calls the "sendmail" program in order to send a mail to the user-provided e-mail address "DESTINATION":
    open(MAIL, "|sendmail @DESTINATION@");
A malicious user could set the DESTINATION user parameter in ways that will allow arbitrary commands to be executed on the server, For example, Table 1 below provides two examples of commands that can be executed on the server.

TABLE 1

| DESTINATION VALUE | CODE | EFFECT |
| --- | --- | --- |
| ; uname -a | "| sendmail ; uname -a" | Execution of the "uname" command |
| & rm -rf / & | "|sendmail &rm -rf / &" | Deletion of the server contents |

Thus, with a simple URL like:
http://www.example.com/application/
    cart.cgi?option=2&destination=&rm%20-rf%20/&,
a malicious user could delete all the files in the server, install a Trojan horse, download company databases, break into the internal network, etc.

If the system 20 was used, the form will include a signature that will describe the FORM data and values abstraction. For example, the form may appear as follows:
http://www.example.com/application/
    cart.cgi?option=2&destination=store@example.com&
    HIVEDATA=XYZO
If a user tries to modify the request parameters, as in:
http://www.example.com/application/
    cart.cgi?option=2&destination=;rm%20-
    rf&HIVEDATA=XYZO
The system 20 determines that the signature does not correspond with the parameters in the request. The system 20 will conclude that parameter tampering occurred and stop the request from getting to the application.

D. False Order Billing Details

The system 20 can also be used to prevent false order billing. An http application associated with billing uses the HTML page to store the number, name and price of items in the shopping cart just before checking out. This information is sent back to the application once the user checks out as user request parameters. The application receives the parameters and creates a receipt based on the values provided by the user. An example of a normal request is as follows:

http://www.example.com/application/
    cart.cgi?option=2&item=Apples&count=10&price=100

Obviously, a malicious user could modify these parameters, as the price, in order to modify the bill, so he is charged less than the items are worth by trying the following:

http://www.example.com/application/
    cart.cgi?option=2&item=Apples&count=10&price=1 which could result in charging an amount of "1" instead of "100."

By using the system 20, the form includes a signature that describes the FORM data and values abstraction. Using the same example, the request with the system 20 may appear as follows:

http://www.example.com/application/
    cart.cgi?option=2&item=Apples&count=10&price=100&
    HIVEDATA=DEFG This request includes the HIVEDATA signature of DEFG. If a user tries to modify the request parameters, such as by changing the price with the following request:

http://www.example.com/application/
    cart.cgi?option=2&item=Apples&count=10&price=1&
    HIVEDATA=DEFG then the system 20 decrypts the signature and discovers that the parameters do not match the signature. The system 20 concludes that parameter tampering has occurred and stops the request from getting to the application.

E. Internal Processing Example

A description of the internal processing associated with operation of the system 20 will be described with reference to obtaining customer details. The system 20 needs a signature from the client in order to access any non-start page. This allows the system 20 to control the site flow, as only URLs referenced from pages in the server 26 can be accessed, preventing access to pages not intended for public consumption, samples, and applications that are not meant to be accessed directly.

For an attack of accessing an arbitrary page not referenced directly from the website, the system 20 parses the request and finds that the request is not for a "Start page," meaning that a signature is needed. The system 20 next looks for a signature in the request, and as there is no signature it will display an error message. The system 20 will exit, preventing any further processing of the request.

As mentioned above, the system 20 may be configured for "plug and play." In this configuration, the system 20 allows a server to securely start processing requests without having to set-up any start page information or any other settings. The system 20 accepts requests for pages without a signature, even if they are not listed under the "Start Pages" configuration tab, as long as the request does not pass parameters to an application. The system 20, for instance, will allow access to the following URLs without requiring a signature:

http://www.example.com/
http://www.example.com/departments/
http://www.example.com/departments/page1.html
http://www.example.com/application/
http://www.example.com/application/bill.txt
http://www.example.com/application/cart.cgi but the following will not be allowed without the proper signature:

http://www.example.com/application/cart.cgi?a=b
http://www.example.com/application/cart.cgi?a So, "hidden" or data files accessible from the website will be available to a remote client, even if they are not referenced from within the website. The "plug and play" configuration therefore should not be used when maximum security is desired.

For arbitrary file writing, the system 20 checks that the actual values of user request parameters match the expected values embedded in the signature. If there is a mismatch, the system 20 displays an error message and exits. Arbitrary file writing involves a malicious user modifying one of the parameters of a form sent by the server, "file," which is the filename of a file receiving the user information.

When the system 20 detects that a form is being sent to the remote user, the system 20 intercepts the response from the server 26 and adds its own signature to it, allowing for attack detection and avoiding. The form, once parsed by the system 20, looks like:

---

You are ordering @COUNT@ of @NAME@
at a price of @PRICE@.
<FORM ACTION="/application/cart.cgi">
<INPUT TYPE="hidden" NAME="name" VALUE="Apples">
<INPUT TYPE="hidden" NAME="count" VALUE="10">
<INPUT TYPE="hidden" NAME="price" VALUE="100">
<INPUT TYPE="hidden" NAME="action" VALUE="2">
<INPUT TYPE="hidden" NAME="file" VALUE="bill.txt">
<INPUT TYPE="hidden" NAME="destination"
VALUE="store@example.com">
<INPUT TYPE="hidden" NAME="HIVEDATA"
VALUE="dASas2342SDFSdfsf324234FSsf">
<INPUT TYPE="submit" NAME="Checkout">
</FORM>

---

This form differs from the original form, the form generated by the web server, because a HIVEDATA hidden field has been added. This field is the "signature" of the whole form, encrypted with a key only known to the server that makes the signature tamper-proof. If a user modifies the signature once it is encrypted, the system 20 will detect this modification and prevent any requests bound to the tampered signature.

The signature is an abstraction of the content of the form. The abstraction may therefore include the URL the request came from or the page where the form is. In this example, the URL is http://www.example.com/order.html. The abstraction may also include the URL the request is for or the page to where the form is sent. The "action" field in a form tag in this example is http://www.example.com/application/cart.cgi. The abstraction may also include a description of each argument, including name, value, size and if the field is optional or forced. The analysis and abstraction of the form for this example is shown below in Table 2.

TABLE 2

| Source URL | http://www.example.com/order.html |
| Destination URL | http://www.example.com/application/cart.cgi |

| Variable list | | | |
| --- | --- | --- | --- |
| Name | Value | Size | Optional |
| name | "Apples" | 6 | NO |
| count | "10" | 2 | NO |
| price | "100" | 3 | NO |
| action | "2" | 1 | NO |
| file | "bill.txt" | 8 | NO |
| Destination | "store@example.com" | 17 | NO |

This abstraction is serialized and encrypted, preferably using a symmetric algorithm such as Rijndael. The encryption should allow the server to recover the content of the signature once the client sends back the form contents. The result of the encryption are encoded and embedded inside the form, in the form of a "HIVEDATA" hidden tag. An example of the HIVEDATA tag is as follows:

<INPUT TYPE="hidden" NAME="HIVEDATA" VALUE="dASas2342SDFSdfsf324234FSsf">

Once the system 20 processes the form, the system 20 sends the form to the client, which sees no difference in the appearance of the web page, as "HIVEDATA" is a hidden field.

When the client fills the form and sends it back, the system 20 checks the signature sent by the client against the parameters sent by the client. If the user would have sent the request: http://www.example.com/application/
cart.cgi?name=Apples&count=10&price=100&action=2&destination=store@example.com&file=/home/httpd/htdocs/
index.html&HIVEDATA=dASas2342SDFSdfsf324234FSsf the system 20 detects that the request is not for a "Start Page," so it looks for a signature in the request. Once the system 20 has the encrypted signature, the system 20 decrypts it using the symmetric key that it used to encrypt the message in the previous request.

If the signature has not been tampered, the system 20 proceeds to compare "side by side" the signature contents with the actual contents sent in the request. The system 20 first makes sure that the signature matches the source and destination URLs, so a signature created for a URL can't be used to access a different URL. Once the URLs have been verified to be correct, the system 20 compares the content of the signature with the actual parameters. If the system 20 finds any mismatch, the system 20 signals an error and exits, preventing the application from the attack.

In this example, the system 20 finds a mismatch when checking for the parameter "file," as the signature tells the system 20 to expect:

| File | "bill.txt" | 8 | but instead the system 20 finds:

| File | "/home/httpd/htdocs/index.html" | — |

In the request, since the content of the variable differs from the content expected and located in the signature, the system 20 denies the request. The checks performed by the system 20 include, but are not limited to, variable name, variable content, variable length, and variable required.

X. User Interface

As mentioned above, the system 20 can be configured according to the desires of a customer. This configuration preferably can occur through a web based interface. For security reasons, the interface authenticates the user by username and password before allowing an administrator to create, modify or delete configurations or to assign username and passwords to delegated configurations in case the owner or administrator of a domain needs/wants to manage its domain security settings. This interface allows an administrator to assign access rights in a set-up where domain names are controlled by multiple entities, as in the case of a hosting company, or to create default settings that will be automatically set in the delegated configurations. The system 20 stores the configuration in a plain-text human readable file which allows administrators to automate tasks, such as bulk-adding domains or users to the system 20.

Some exemplary interfaces will be described below in order to explain how the system 20 can be configured. In these interfaces, the system 20 is called a HIVE™ firewall. The system 20 provides many menus which allow users to easily configure the system 20. The interfaces are preferably very intuitive for most people and should not cause problems to edit configurations, view information, etc.

A. Login, Selecting and Deleting a Configuration

Figure 12:
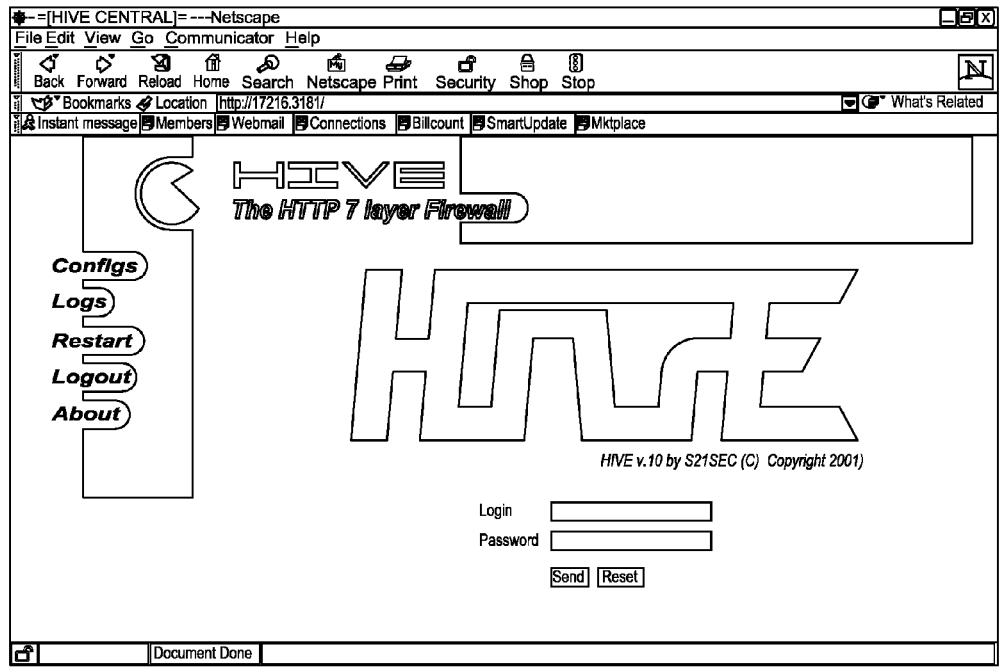
FIG. 12 is an example of a login interface.

A principal menu bar that is present all the time during the configuration is shown in FIG. 12. This menu bar includes links to "Configs," "Logs," "Restart," "Logout," and "About." Through the Configs link, a user can go to a Configs page where the user can edit a configuration. A Logs link provides access to a page where you can see incidences, errors, etc. A Restart link enables the user to restart the server to apply the last changes that was saved and a Logout link return the user to the login page. The About link shows a page with help about developers, project manager, etc.

FIG. 12 is an example of a login page and is the first place that seen when you would like to configure your HIVE firewall. To access this page, the user only need to enter in the port 81 of the machine where the HIVE firewall is installed. To login, the user inputs the Login and Password and, if the user is an administrator, the user has access to all configurations. If the login and password is of a delegated administrator user, then the user can access only his configuration. The Login and Password is only needed at the beginning of a session and is needed every time that a new session is begun.

Figure 13:
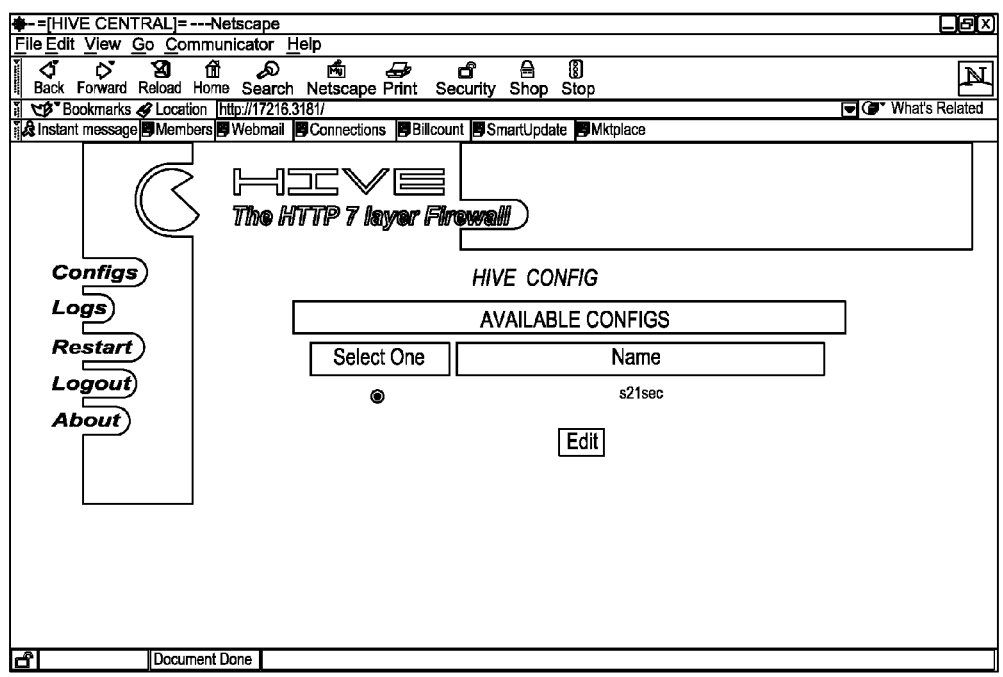
FIG. 13 is an example of a configuration select interface.
Figures 14, 15:
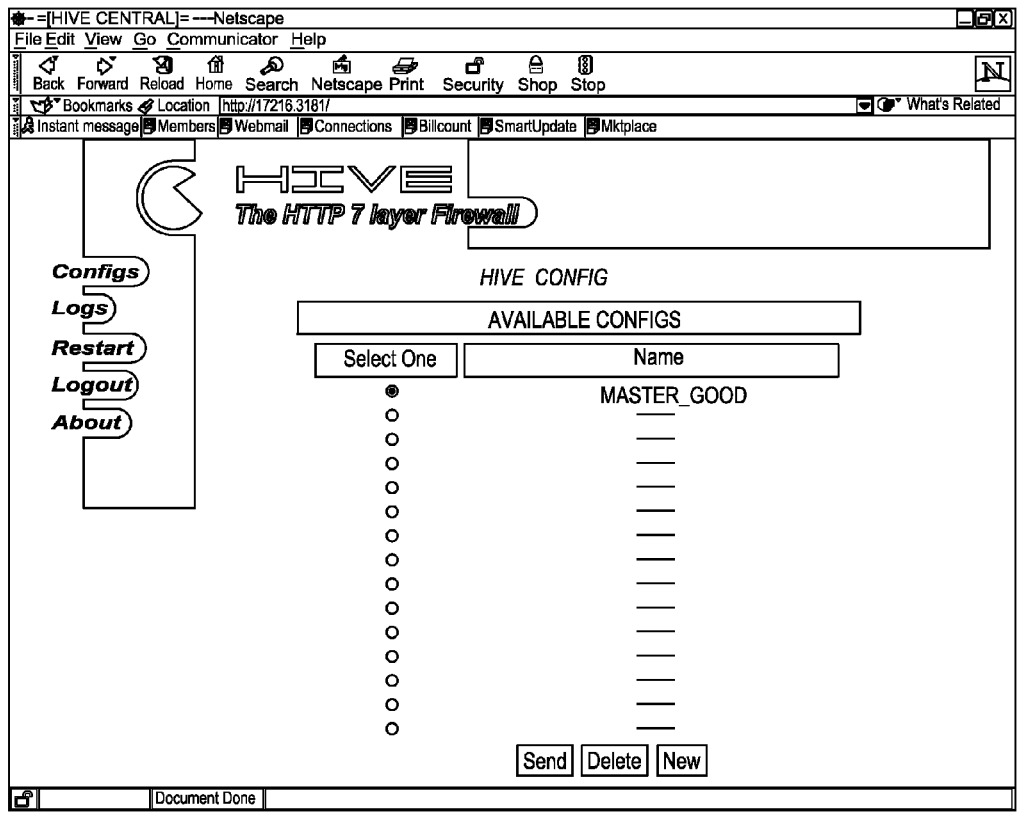
FIG. 14 is an example of an administrator configurations select page.
FIG. 15 is an example of a general configuration page.

Once the login and password are entered correctly, the system 20 provides the user with the interface shown in FIG. 13 and the user is prepared to edit the desired configuration. The user may have more than one configuration available to choose to edit. As shown in FIG. 14, the administrator is presented with all of the configurations. The desired configuration is selected and then the user can proceed to edit it by pushing the Edit button.

The system 20 allows the administrator to edit, delete and create configurations by selecting the Edit, Delete, or New buttons. Thus, to edit a configuration, the user selects a configuration and clicks on the Edit button. If the user wants to delete a configuration, the user select that configuration and pushes the Delete button. To create a new configuration, the user pushes the New button.

B. General Configuration

By selecting the "Configs" link from the menu bar, the user can change general options of the configuration. To view the actual general configuration, the user clicks on the General tab and receives an interface such as the one shown in FIG. 15. If the configuration is new, the default name is NoNameXX, where 'XX' is the number of the configuration.

To edit the actual configuration, the user clicks on the Edit button and the user receives the interface shown in FIG. 16. Through this interface, the user can select Config Name to change the name of the configuration, Config Settings to select the "plug and play" configuration termed EZ Hive. Even though EZ HIVE is "plug and play," this configuration still allows for a great deal of customisation and security settings. A pure "plug and play" configuration option is defined which allows a user with no security knowledge to provide security to the applications hosted on its site, with no need to configure any settings. The default value is NO.

The EZ Hive settings are such that the system 20 will only sign objects that will access an application, including forms and links where parameters are passed. The system 20 will not protect pages, nor check for signatures, where no arguments are involved. This allows a server to protect its applications without having to set up start pages. The system 20 will not protect cookies, in order to protect cookies the cookie section of the configuration must be defined. Client side scripting security settings are set to "LOW," allowing most of Javascript applications to work, while protecting server side applications. EZ Hive should not be used if maximum security is required. EZ Hive defines a set of security settings, but is no substitute of a properly customized server. Also, EZ Hive should not be used if page content is out of the scope of the organization, such as with an ISP that offers web hosting to its users. In this set-up, Except Pages are recommended, as a malicious user could use web access to create pages that once signed will allow him to subvert application security. With the Save, Reset, and Cancel buttons, the user can save the new general configuration, restore the initial values, or cancel the operation.

C. Custom Error Configuration

By selecting the Custom Error tab, the user is presented with the interface shown in FIG. 17. This interface provides an option menu to redirect a request to another page when an error occurs. Preferably, the redirected page informs the user of what kind of error has occurred. For example, a URL Error should inform the user that an incorrect URL was entered, a Signature Not Found (Error) informs the user that an attempt was made to access a page that requires a signature but no signature was present, a Signature Mismatch (Error) informs the user that the signature is valid, but did not corresponds with the URL, and a Tamper Error informs the user that the signature is not valid because the signature has been modified or expired.

D. Key Configuration

By selecting the "Key" tab, the user receives the interface shown in FIG. 18. This interface is dedicated to configure the parameters of the key, such as length and life time, and to display information about the actual and the old key. The Actual Key shows information about the actual key, with this key being used by the system 20 to sign the parameters which are needed to be signed and to decrypt signatures. The Old key shows the same information as Actual key, but about the key which was used before the actual key. The old key was used to decrypt signatures that were signed with it but the life-time of this key has expired and a new key has been generated.

The user can generate a new key and can select its length and its life time. To generate a new key, the user selects the Key button and a new key is generated immediately and the actual key data is copied over the old key data. If a new key is generated two or more times in a short time space, the old key possibly might not be useful. It is possible that data was encrypted with this key but that data signed with the "old-old key" cannot be decrypted. When editing a new configuration, a first key must be generated and saved.

The user can alter properties of the keys. For example, as shown in FIG. 19, the user can adjust the key Size or as shown in FIG. 20 the user can adjust the Life Time, both of which determine the level protection of your configuration. More security can be provided to a server 26 by increasing the key size. The default value is 128. With key life-time, the opposite is the case; decreasing the life-time of the key actually increases the security of the server 26. The default value is 1 hour.

E. Node Configuration

FIG. 21 provides an example of a node configuration interface. Through this interface, a user can specify the address of a new node, edit an existing node, or delete a node. FIG. 22 illustrates the editing of a node 1.2.3.4 and depicts buttons presenting the user with the options to Save, Reset, or Cancel the changes.

F. Domains Configuration

FIG. 21 depicts an example of a domains main page interface where a user can set the domain and the IP where it is mapped. A configuration can take more than one domain, and all are showed in the Available Domains fields. A configuration need at least one domain, and the system 20 will prevent a user from saving a configuration unless at least one domain is specified. In the drop-down menu Protocol, a user can select between http:// or https:// protocol. In the Host bar, the user enters the name of the host specifies the port in the Port bar. In the IP bar, the user inputs the IP address to map with the domain and the port. To edit a domain, the user clicks on the Edit button of the configuration and the user receives a domains edit page interface shown in FIG. 24, where the user can change the configuration as desired.

G. Start Pages Configuration

A user can define URL resources as "Start Pages," meaning that in order to access the resource no signature is needed. After selecting "Configs" from the menu bar and then the Start Pages tab, the user receives the Start Page main menu, such as the one shown in FIG. 25. The user must define at least a domain and, if one is not specified, the system 20 will block access to the Start Pages tab. Start pages should be configured to be those pages in the website structure that a user can access directly, such as by typing them in the URL bar of a browser which should include the main welcome page and possibly the main page for departments, etc. Since access to Start pages is not restricted by the system, an application should not be placed as a Start page as it will be vulnerable to attacks.

To add a new start page, the user selects the domain, types the new start page in the bar at right of the domain, and then clicks the Add button. To delete a start page, the user clicks on the Delete button at right of the start page that should be erased. To edit a start page, the user clicks on the Edit button of the start page that should be edited. An example of an edit page is shown in FIG. 26, where the user is presented with buttons to Save, Reset or Cancel the changes. When editing a new configuration, the user must define at least one start page, after the configuration is saved.

H. Except Pages Configuration

A user can set-up URL resources as "Exception Pages" for pages that will not be signed before they are sent to the client. After selecting the "Configs" menu item and then the Except Pages tab, the user is presented with the interface shown in FIG. 27. The user must define at least a domain and, if one is not specified, the system 20 will block access to the Except Pages tab. The Except pages are intended to be used in those set-ups where some content is out of the control of the organization, as in an ISP set-up where users can modify their own web pages and signing of those pages could compromise security, as a malicious user could publish a web page with links to malformed requests that could lead to application security problems.

To add a new except page, the user selects the domain, types the new Except page in the bar at right of the domain, and then clicks the Add button. To delete an Except page, the user clicks on the Delete button at right of the except page that should be erased. To edit an Except page, the user clicks on the Edit button of the Except page that should be edited. An example of an Except page edit interface is shown in FIG. 28, where the user is presented with buttons to Save, Reset or Cancel the changes I. Default Configuration An example of a default interface is shown in FIG. 29. Through this interface, an administrator can set the size of a bar campoXXX, or a text box, to protect it.

J. Admin Mail Configuration

The system 20 allows the user to configure the admin mail where alerts and other notices are delivered. The admin mail, for example, is the email address where all incidences registered in the configuration as URL errors, signature mismatch errors, etc. are sent. The Admin Mail interface is specific for a configuration and the user preferably cannot specify multiple e-mails per error. FIG. 30 is an example of an Admin-Mail interface where the user is presented with buttons to Save, Reset, or Cancel the changes.

K. User Configuration

By selecting the User tab, the user receives the interface shown in FIG. 31 which is for a new configuration. Through this interface, the user can change the password that allows access to configure the system 20. If the configuration is new, the user first defines the login and password before saving the configuration. Preferably, only the administrator can change the login of a configuration, but other users can access the User tab to change their own passwords, as shown in the interface in FIG. 32. To change the password, the user clicks on the Edit button in User tab. As shown in FIG. 33, the user enters the password in the Password bar and retypes it in the Confirm Password bar. The user then selects one of the Save, Reset, or Cancel buttons.

L. Saving the Configuration

The user can save or cancel the changes in the configuration by selecting the Save Config or Cancel buttons presented at the bottom of the interfaces. Thus, to save the changes, the user clicks the Save Config button and to cancel the editing operation, the user pushes the Cancel button. After selecting either one of these buttons, the user is returned to the configurations select page shown in FIG. 13.

M. Logs View

Figure 35:
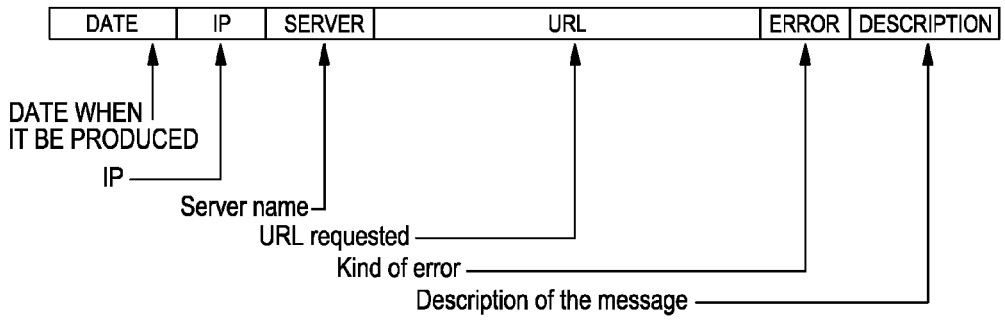
FIG. 35 is an example of a legend provided in a logs interface.
Figure 36:
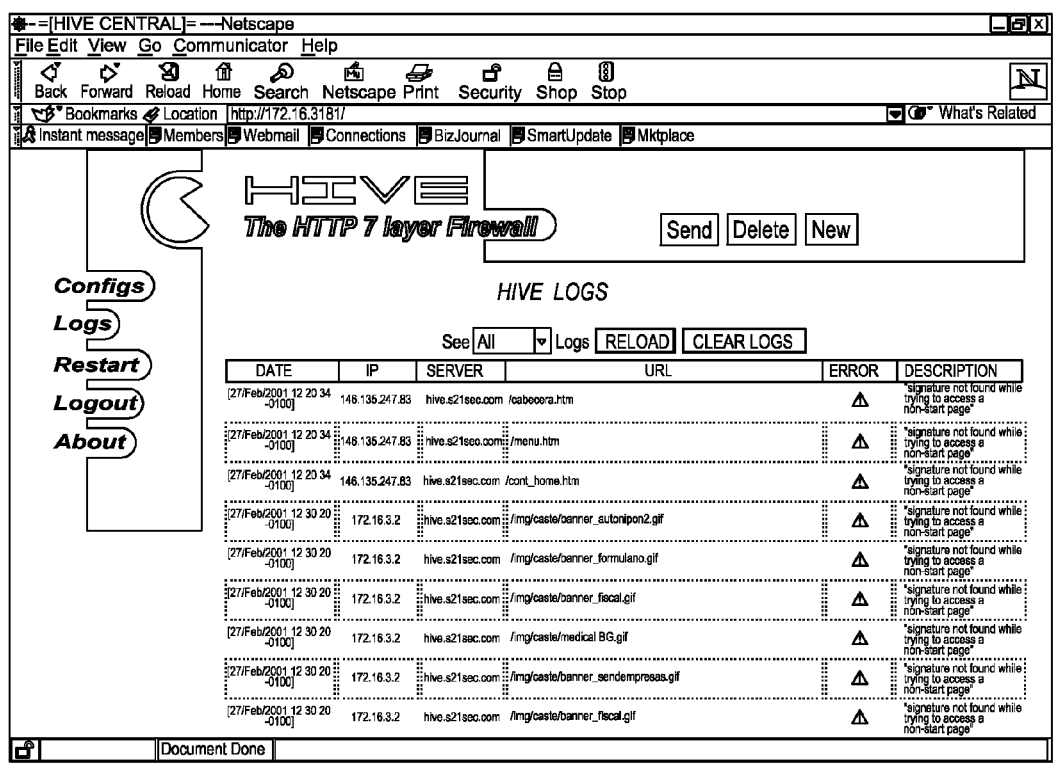
FIG. 36 is an example of a logs page interface.

As mentioned above, the system 20 maintains a log of all errors and other incidences. The system 20 preferably allows users to view the incidences that are produced in your configuration through the Logs page. FIG. 35 illustrates a partial view of this interface, showing a main heading, and FIG. 36 is an example of a logs interface. The logs interface preferably lists the date when the event was produced, an IP address, server name, requested URL, kind of error, and a description of the message.

As shown in FIG. 36, within the log itself, the system 20 indicates the success associated with the event. A yellow triangle sign with an exclamation point alerts the user that a custom error occurred. A red circle with an X in it alerts the user about a possible bad configuration of the system, such as a domain which has no configuration associated with it. A information bubble with an "i" in it informs the user of normal success in the system 20, such as a key has expired, a node configuration was reread, or an initialisation of the master node was completed.

Figure 37:
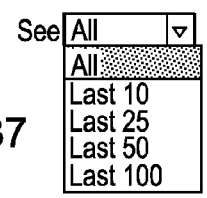
FIG. 37 is an example of a drop-down menu with the logs page interface.

FIG. 37 depicts a drop-down menu, forming part of the interface in FIG. 36, that allows a user select the number of logs to view. To see all the logs, the user selects the All item in the drop-down menu. To see only the most recent events, the user can select the Last 10 item. In displaying the events, the system 20 places the most recent logs at the bottom of the page and the oldest at the top. A Reload button reads the file logs again, for a possible new log/s appears, and the Clear Logs button delete the logs file.

N. Restarting the Server

Finally, before the changes can take effect, the user should restart the system 20. After the user saves the configuration, the user click the Restart icon on the menu bar. If no problems were encountered, the system 20 presents the user with the interface shown in FIG. 38, informing the user that the server was successfully restarted. This interface disappears after the server has completely restarted.

The foregoing description of the preferred embodiments of the invention has been presented only for the purpose of illustration and description and is not intended to be exhaustive or to limit the invention to the precise forms disclosed. Many modifications and variations are possible in light of the above teaching.

For example, the invention has been described with reference to a client-server environment in which the transmission from the server is a response and the transmission from the client is a request. As explained above, the invention is not limited to a client-server environment where a transmission occurs only after a request. Further, as should be apparent from the description, the system 20 receives the response from the server 26 prior to receiving the request from the client 24. The request in this context therefore does not precede the response.

Further, as explained above, the invention is not limited to HTTP applications but may be extended to other protocols. Additionally, even if HTTP is most commonly associated with the WWW, HTTP and thus the invention can be used in other environments as content server, such as XML documents. While HTML was used to provide examples throughout this document, the invention can be applied to other and new languages, such as by plugging in new content parser libraries.

Also, while the examples of the invention describe providing a single signature for one piece of content, such as one page, it should be understood that multiple signatures may be embedded within a single page. For example, one page containing multiple forms may be associated with a signature for each of the forms. The request from the client which has a single form would then send only one of the signatures back to the server.

The embodiments were chosen and described in order to explain the principles of the invention and their practical application so as to enable others skilled in the art to utilize the invention and various embodiments and with various modifications as are suited to the particular use contemplated.

We claim:

1. A method for validating a communication sent from a client computer to an application server, the method comprising the steps of:

a security server intercepting a first HTML document describing a first electronic form sent by the client computer addressed to the application server before the first form is processed by the application server, and in response, the security server generating a signature based on session information that is contained in the first HTML document but is not displayed during rendering of the first HTML document, and forwarding the first HTML document with the signature to the application server;

in response to the first HTML document forwarded from the security server, the application server processing the first form, and returning to the client computer a second HTML document for a second, related form, the second HTML document for the related form having the session information which was the basis for the signature, the signature not being displayed during rendering of the related form; and the security server intercepting the second HTML document for the related form with the signature subsequently sent by the client computer addressed to the application server before the related form is processed by the application server, the related form having data entered by the user, and in response, the security server determining that the signature in the second HTML document matches the signature from the first HTML document, and in response, the security server forwarding to the application server the second HTML document for the related form for processing by the application server.

2. The method of claim 1 wherein the session information comprises a name of a log file to which each transaction of a session is written.

3. The method of claim 1, wherein before the step of the security server determining that the signature in the second HTML document matches the signature from the first HTML document, further comprising the step of the security server determining that the related form is not exempt from preventing the related form intercepted by the security server from being forwarded to the application server.

4. The method of claim 1 wherein the signature included with the related form and addressed by the client computer to the application server is encrypted.

5. The method of claim 1, comprising:
the security server intercepting messages sent by the client computer to the application server; and
the security server intercepting messages sent by the application server to the client computer.

6. A computer program product for validating a communication sent from a client computer to an application server, the computer program product comprising:
one or more computer-readable storage devices and program instructions stored on at least one of the one or more storage devices, the program instructions comprising:
program instructions, for execution in a security server, to intercept a first HTML document describing a first electronic form sent by the client computer addressed to the application server before the first form is processed by the application server, and in response, generate a signature based on session information that is contained in the first HTML document but is not displayed during rendering of the first HTML document, and forward the first HTML document with the signature to the application server;
program instructions, for execution in the application server, responsive to the first HTML document forwarded from the security server, to process the first form, and return to the client computer a second HTML document for a second, related form, the second HTML document for the related form having the session information which was the basis for the signature, the signature not being displayed during rendering of the related form; and
program instructions, for execution in the security server, to intercept the second HTML document for the related form with the signature subsequently sent by the client computer addressed to the application server before the related form is processed by the application server, the related form having data entered by the user, and in response, determine that the signature in the second HTML document matches the signature from the first HTML document, and in response, forward to the application server the second HTML document for the related form for processing by the application server.

7. The computer program product of claim 6 further comprising program instructions, for execution in the security server before the execution of the program instructions which determine that the signature in the second HTML document matches the signature from the first HTML document, to determine that the related form does not automatically pass to the application irrespective of the signature included with the related form.

8. The computer program product of claim 6 wherein the signature included with the related form and addressed by the client computer to the application server is encrypted.

9. The computer program product of claim 6, wherein the program instructions comprise:
program instructions, for execution in the security server, to intercept messages sent by the client computer to the application server; and
program instructions, for execution in the security server, to intercept messages sent by the application server to the client computer.

10. The computer program product of claim 6, wherein the session information comprises a name of a log file to which each transaction of a session is written.

11. A computer program product for validating a communication sent from a client computer to an application server, the computer program product comprising:
one or more computer-readable storage devices and program instructions stored on at least one of the one or more storage devices, the program instructions comprising:
program instructions, for execution in a security server, to intercept a first HTML document describing a first electronic form sent by the client computer addressed to the application server before the first form is processed by the application server, and in response, generate a signature based on information with the form specifying a permitted maximum length of data in a field of the form, and forward the first HTML document with the signature to the application server;
program instructions, for execution in the application server, responsive to the first HTML document forwarded from the security server, to process the first form, and return to the client computer a second HTML document for a second, related form, the second HTML document for the related form having the session information which was the basis for the signature, the signature not being displayed during rendering of the related form; and
program instructions, for execution in the security server, to intercept the second HTML document for the related form with the signature subsequently sent by the client computer addressed to the application server before the related form is processed by the application server, the related form having data entered by the user, and in response, determine that the signature in the second HTML document matches the signature from the first HTML document, and in response, forward to the application server the second HTML document for the related form for processing by the application server.

12. The computer program product of claim 11 further comprising program instructions, for execution in the security server before the execution of the program instructions which determine that the signature in the second HTML document matches the signature from the first HTML document, to determine that the related form does not automatically pass to the application irrespective of the signature included with the related form.

13. The computer program product of claim 11 wherein the signature included with the related form and addressed by the client computer to the application server is encrypted.

14. The computer program product of claim 11, wherein the program instructions comprise:
program instructions, for execution in the security server, to intercept messages sent by the client computer to the application server; and
program instructions, for execution in the security server, to intercept messages sent by the application server to the client computer.

* * * * *